(12) United States Patent
Hara et al.

(10) Patent No.: US 7,305,744 B2
(45) Date of Patent: Dec. 11, 2007

(54) APPARATUS FOR FORMING A POWER TRANSMISSION BELT

(75) Inventors: Hirotaka Hara, Ayabe (JP); Akihiro Nagata, Fukuchiyama (JP); Yoshihiro Kanayama, Fukuchiyama (JP); Eisuke Kitamura, Ayabe (JP)

(73) Assignee: Mitsuboshi Belting Ltd., Kobe (JP)

(*) Notice: Subject to any disclaimer, the term of this patent is extended or adjusted under 35 U.S.C. 154(b) by 270 days.

(21) Appl. No.: 11/210,432

(22) Filed: Aug. 24, 2005

(65) Prior Publication Data
US 2006/0060056 A1 Mar. 23, 2006

(30) Foreign Application Priority Data

| Aug. 24, 2004 | (JP) | ............................. 2004-243115 |
| Nov. 30, 2004 | (JP) | ............................. 2004-345100 |
| Dec. 21, 2004 | (JP) | ............................. 2004-368965 |
| Dec. 24, 2004 | (JP) | ............................. 2004-372947 |
| Jan. 31, 2005 | (JP) | ............................. 2005-023069 |
| May 27, 2005 | (JP) | ............................. 2005-155427 |

(51) Int. Cl.
*B23P 23/00* (2006.01)

(52) U.S. Cl. ........................ 29/33 S; 409/138; 409/157; 409/161; 83/935

(58) Field of Classification Search ................ 29/33 Q, 29/33 S, 411, 412; 409/138, 157, 161, 173, 409/143; 83/935, 581, 578
See application file for complete search history.

(56) References Cited

U.S. PATENT DOCUMENTS

| 2,660,243 | A | * | 11/1953 | Lomazzo | ........................ 82/86 |
| 3,151,491 | A | | 10/1964 | Case | |
| 3,701,186 | A | * | 10/1972 | Kuts | ........................... 29/33 A |
| 3,818,576 | A | * | 6/1974 | Braden et al. | ................. 29/414 |
| 4,488,465 | A | * | 12/1984 | Brand et al. | .................... 83/175 |
| 4,554,850 | A | * | 11/1985 | Edgar et al. | .................... 83/178 |
| 4,586,410 | A | * | 5/1986 | Muller-Erwig et al. | ........ 83/175 |
| 4,782,575 | A | * | 11/1988 | Kamiyama et al. | ............ 29/411 |
| RE33,606 | E | * | 6/1991 | Kamiyama et al. | ............ 29/411 |
| 5,882,157 | A | * | 3/1999 | Buysman et al. | ............ 409/157 |
| 6,217,414 | B1 | * | 4/2001 | Michirura et al. | ............. 451/28 |
| 6,647,843 | B1 | * | 11/2003 | Takasaki et al. | ................ 83/72 |
| 2006/0046885 | A1 | * | 3/2006 | Hara et al. | ................... 474/237 |

FOREIGN PATENT DOCUMENTS

| DE | 2129489 A | * 12/1971 |
| GB | 2143924 A | 2/1985 |
| JP | 55-28883 | 2/1980 |
| JP | 62-253436 | 11/1987 |
| JP | 11-333679 | 12/1999 |

* cited by examiner

*Primary Examiner*—Erica Cadugan
(74) *Attorney, Agent, or Firm*—Wood, Phillips, Katz, Clark & Mortimer

(57) ABSTRACT

An apparatus for forming a power transmission belt/belt sleeve with first and second shafts around which a belt/belt sleeve preform is trained. The belt/belt sleeve preform is guided and driven in an endless path around the shaft. A cutter bears against the belt/belt sleeve preform to bias cut side surfaces thereon.

27 Claims, 10 Drawing Sheets

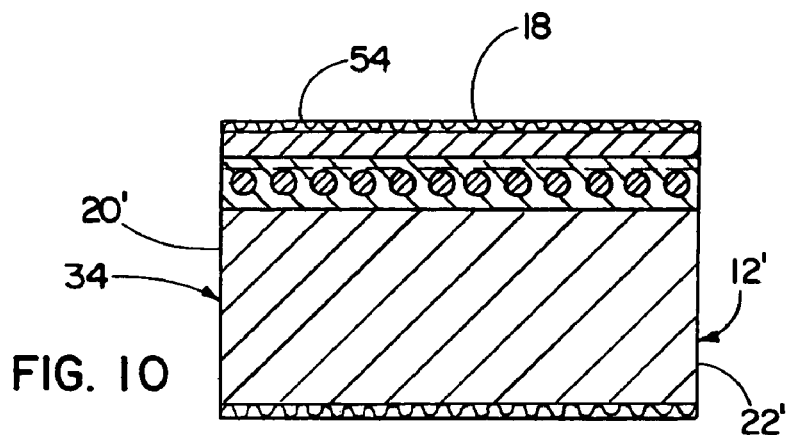
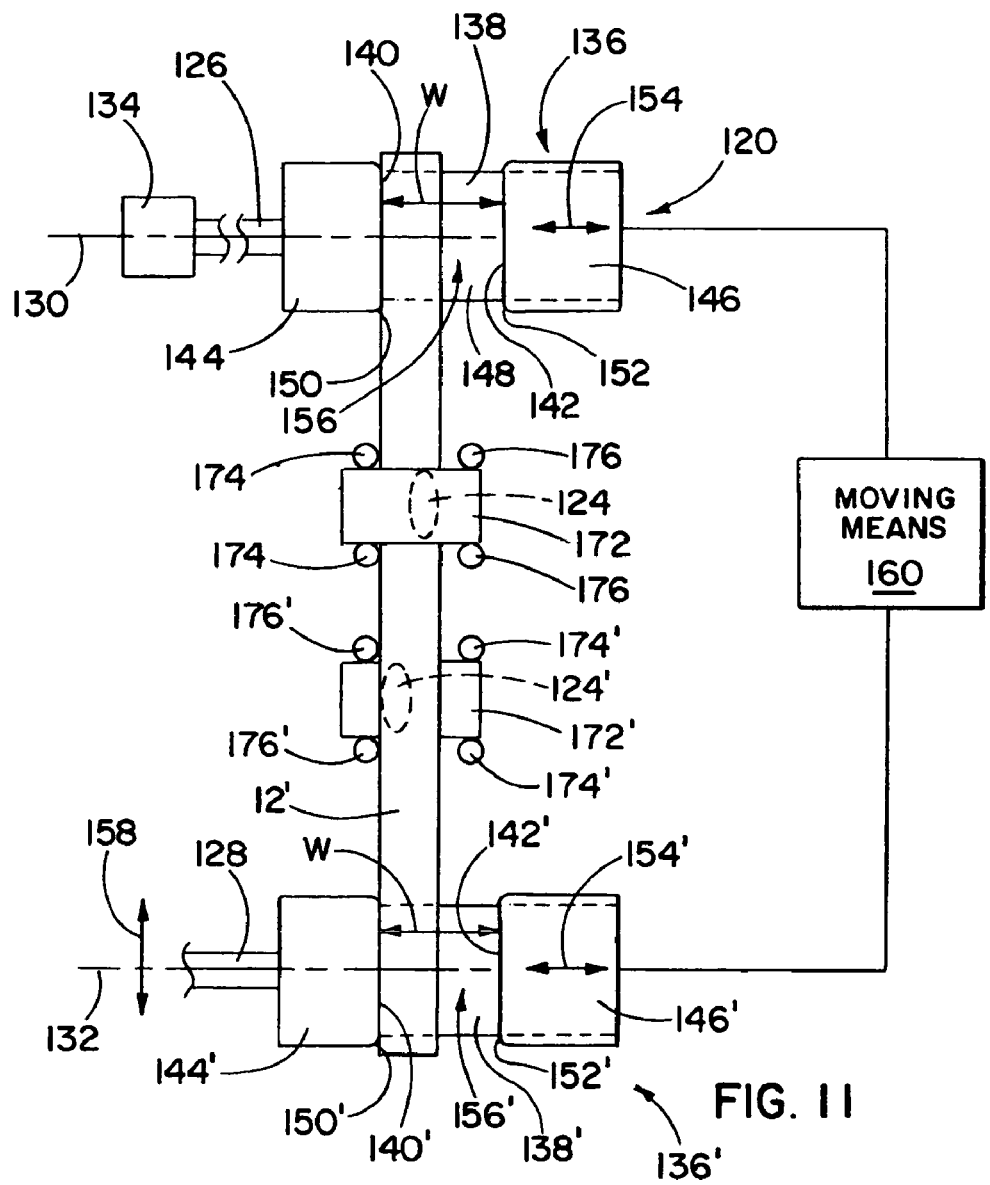

APPARATUS FOR FORMING A POWER TRANSMISSION BELT

BACKGROUND OF THE INVENTION

1. Field of the Invention

This invention relates to power transmission belts and, more particularly, to a power transmission belt having a bias cut side surface. The invention is further directed to an apparatus for forming a power transmission belt/belt sleeve, including those having a bias cut side surface.

2. Background Art

It is common to manufacture V-belts by initially forming a belt sleeve consisting of rubber and other component parts. The belt sleeve is vulcanized and thereafter cut to produce individual belts having a trapezoidal cross-sectional shape. This conventional manufacturing process often results in structural variations that may compromise the performance of the belt and its operation. The length and cross-sectional shape of the belt may vary due to thermal shrinkage of material defining the belt. Load carrying cords, between tension and compression sections, may be less than optimally located. Other flaws may occur in the machining process that result in the production of a belt with less than the desired quality.

Of these problems, the variation in cross-sectional size and shape is of particular concern. This condition may cause the position of a belt within a cooperating pulley groove to fluctuate in a radial direction relative to the pulley axis. This fluctuation may cause vibrations to be induced during running. This condition may also cause fluctuation in the belt tension, which may cause vibration of pulleys, around which the belt is trained, and associated machinery.

To address the above problem, it is known to subject the individual V-belts, cut from a sleeve, to a sanding process. An exemplary structure and method for accomplishing this are shown in the Official Gazette of Japanese Patent No. 3553371. The cut belt is trained around a pair of pulleys and driven in an endless travel path. As the belt is traveling, the sides are polished to be brought within dimensional tolerances.

One advantage associated with polishing the side surfaces is that a substantial area of short staple reinforcing fibers becomes exposed at the belt side surfaces. As a result, the coefficient of friction between the side surfaces and cooperating pulleys is decreased, as a result of which noise generation, particularly at startup, is maintained generally at an acceptably low level. On the other hand, as the belt slips, due to the reduced coefficient of friction, unwanted abrasion and heat generation may occur.

In an alternative process, the vulcanized sleeve can be turned inside out and placed on a mandrel. While rotating the mandrel, V-shaped grooves can be cut into the sleeve using a grinding stone, after which a cutter is employed to separate the individual belts. An exemplary structure and method of forming belts in this manner are described in U.S. Pat. No. 3,818,576.

A further apparatus and method for forming V-belts are shown in the Official Gazette of JP-B-4-2425. An apparatus is disclosed therein including a driving pulley and a driven pulley around which a belt preform is trained for movement in an endless path. The driven pulley is movable along a guide rod. A pair of rotatable cutting blades are used to reconfigure/form the belt sides. A pushing roller is provided at a cutting location to bear against a back face of the belt to reinforce the same as the cutting blades are pressed against the belt. The cutting occurs as the belt is driven and the cutting blades rotate.

With this apparatus, the rotary cutting blades are arranged relative to each other such that both sides of the belt are interposed between the rotary cutting blades to be simultaneously operated upon. As a result, relatively large components may be required for the cutter, including the cutting blades, to effect the required cooperative movement between the belt and the cutter. Generally, with increased complication and size of an apparatus, weight and manufacturing expense correspondingly increase.

In Official Gazette of JP-A-55-28883, an apparatus and method are shown wherein cutting of a belt sleeve is carried out so that the finished forms of adjacent belts coincide at their sides. As a result, the amount of material that is removed and must be disposed of, or otherwise handled, is reduced compared to a system wherein there is a spacing between adjacent belts.

With the sides of adjacent belts coincident, a certain amount of material can be saved. However, there is still a significant amount of scrap that results. Thus, there is still room for improvement with respect to minimizing scrap generation.

This latter method is preferable in this regard to the previously described methods, which generate considerable scrap or waste material. For example, the cutting blades may remove a significant, ring-shaped scrap at each side surface. Scrap generated through grinding, shaving or polishing may likewise be significant in the above-described methods. Generally, there is a strong desire to reduce the quantity of scrap generated during the belt forming process both to save material and time as well as avoid inconvenience associated with handling the generated scrap.

It is also an objective of designers of this type of equipment to provide structure that is compact and affordable, yet capable of producing high quality power transmission belts. Another aim of designers of such systems is to allow these processes to be carried out in a time efficient manner.

SUMMARY OF THE INVENTION

The invention is directed to an apparatus for forming a power transmission belt/belt sleeve. The apparatus has first and second shafts about which an endless belt/belt sleeve preform can be trained. At least one of the first and second shafts is capable of being driven to cause a belt/belt sleeve preform trained around the first and second shafts to be moved in an endless travel path. The first shaft has a small diameter portion between spaced larger diameter portions arranged so that a belt/belt sleeve preform trained around the first and second shafts resides between the larger diameter portions. A pushing component is provided at a cutting location. At least one guide element is provided also at the cutting location. A cutter is provided to bear against and form a part of a belt/belt sleeve preform traveling around the first and second shafts. The pushing component serves to reinforce a belt/belt sleeve preform that is trained around the first and second shafts and borne against by the cutter. The at least one guide element is situated to bear against a side of a belt/belt sleeve preform traveling around the first and second shafts to confine movement of a belt/belt sleeve preform at the cutting location.

The apparatus may further be provided in combination with an endless belt/belt sleeve preform trained around the first and second shafts, with the belt/belt sleeve preform having an inside, an outside, and spaced sides and consisting of a compression rubber layer, a tension rubber layer, and at least one load carrying member between the inside and outside of the belt/belt sleeve preform.

The spaced sides of the belt/belt sleeve preform may be substantially parallel to each other before being formed by the cutter.

The belt/belt sleeve preform may be placed under tension between the first and second shafts.

In one form, the at least one guide element consists of first and second rollers that bear one each against the sides of the belt/belt sleeve preform.

The pushing component may be a pushing roller.

In one form, the cutter is movable relative to the belt/belt sleeve preform to bias cut one of the spaced sides of the belt/belt sleeve preform.

The compression rubber layer may reside between the larger diameter portions of the first shaft.

In one form, the pushing component and cutter are relatively situated so that the cutter cannot contact the pushing component as the apparatus is operated.

In one form, one of the larger diameter portions is movable selectively towards and away from the other of the larger diameter portions.

The sides of the belt/belt sleeve preform may be captively held between the larger diameter portions.

In one form, a distance from the outside of the belt/belt sleeve preform to the outside of the load carrying member is defined as L. The spaced sides of the belt/belt sleeve preform are bias cut relative to a plane bisecting the belt/belt sleeve preform between the spaced sides from a boundary location, spaced from the outside of the belt/belt sleeve preform by 90-100% of the distance L, to the inside of the belt/belt sleeve preform.

In one form, as an incident of bias cutting the belt/belt sleeve preform, an endless portion of the belt/belt sleeve preform is separated and caused to embrace one of the spaced larger diameter portions of the first shaft so as to follow rotational movement of the first shaft.

In one form, with the belt/belt sleeve preform trained around the first and second shafts, the belt/belt sleeve preform defines an inner circumference within which a cutting space is defined and the cutter is movable (a) in one direction within the cutting space to reconfigure one of the spaced sides of the belt/belt sleeve preform and (b) generally oppositely to the one direction within the cutting space to reconfigure the other of the spaced sides of the belt/belt sleeve preform.

The invention is further directed to an apparatus for forming a power transmission belt/belt sleeve having first and second shafts about which an endless belt/belt sleeve preform can be trained. At least one of the first and second shafts is capable of being driven to cause a belt/belt sleeve preform trained around the first and second shafts to be moved in an endless travel path. A pushing component is provided at a cutting location. A cutter is provided and movable at the cutting location (a) in one direction to reconfigure one of two spaced sides on a belt/belt sleeve preform trained around the first and second shafts and (b) generally oppositely to the one direction to reconfigure the other of the two spaced sides on a belt/belt sleeve preform trained around the first and second shafts.

The apparatus may be provided in combination with an endless belt/belt sleeve preform trained around the first and second shafts, wherein the belt/belt sleeve preform has an inside, an outside, and spaced sides and consists of a compression rubber layer, a tension rubber layer, and at least one load carrying member between the inside and outside of the belt/belt sleeve preform.

In one form, the belt/belt sleeve preform defines an inner circumference bounding a cutting space within which the cutter resides.

The spaced sides of the belt/belt sleeve preform may be substantially parallel to each other before being reconfigured by the cutter.

In one form, the cutter has first and second cutting blades that can be fixed relative to each other and which are arranged so that one of the cutting blades reconfigures one of the spaced sides of the belt/belt sleeve preform and the other of the cutting blades reconfigures the other of the spaced sides of the belt/belt sleeve preform.

In one form, the cutter consists of first and second disk-shaped cutting blades, each having an axis. The cutting blades are radially overlapped, with the axes of the first and second cutting blades non-coincident.

In one form, the first cutting blade can be selectively fixed in different angular positions around the first axis.

The pushing component may reinforce the belt/belt sleeve preform with the cutter moving in the one direction. The apparatus may further include a second pushing component to reinforce the belt/belt sleeve preform with the cutter moving oppositely to the one direction.

In one form, the cutter bias cuts the sides of the belt/belt sleeve preform relative to a reference plane bisecting the belt/belt sleeve preform between the sides of the belt/belt sleeve preform.

In one form, the belt/belt sleeve preform is placed under tension between the first and second shafts.

In one form, the cutter consists of first and second cutting blades carried upon an arm that projects into the cutting space.

In one form, the arm is elongate with a length extending substantially parallel to an axis around which the first shaft is movable.

The arm may be movable selectively parallel to and orthogonally to the length of the arm.

BRIEF DESCRIPTION OF THE DRAWINGS

FIG. 10 is a cross-sectional view of a squared belt preform used to construct the belt in FIG. 2;

FIG. 11 is a schematic, elevation view showing one form of belt forming apparatus, according to the present invention;

DETAILED DESCRIPTION OF THE DRAWINGS

Figure 1:
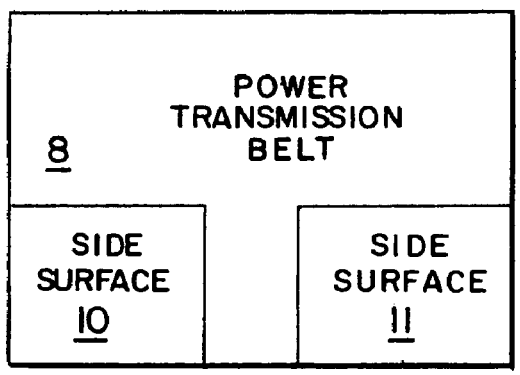
FIG. 1 is a schematic representation of a power transmission belt of the type that can be made according to the present invention.

The invention can be practiced with virtually any type of power transmission belt, as shown generically at 8 in FIG. 1, having spaced pulley-engaging side surfaces 10, 11.

Figure 2:
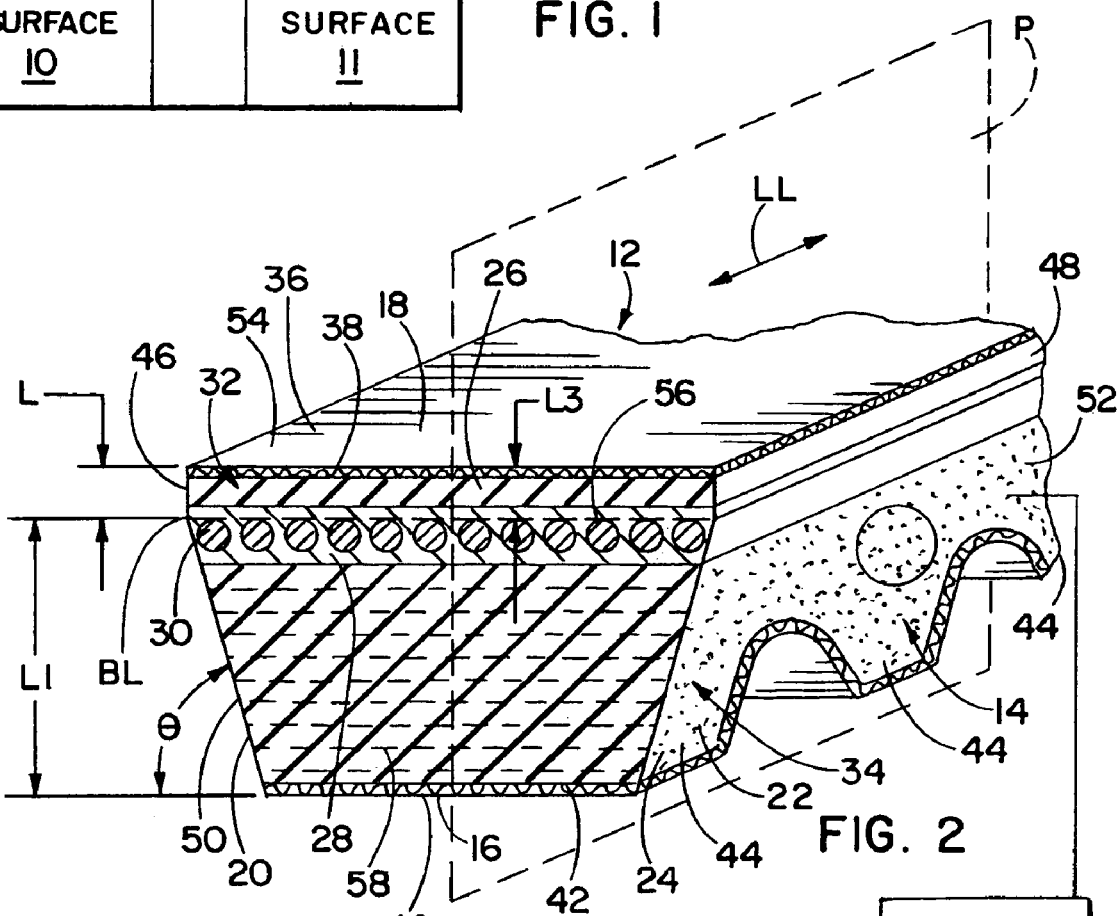
FIG. 2 is a fragmentary, perspective view of one form of power transmission belt, made according to the present invention.
Figure 3:
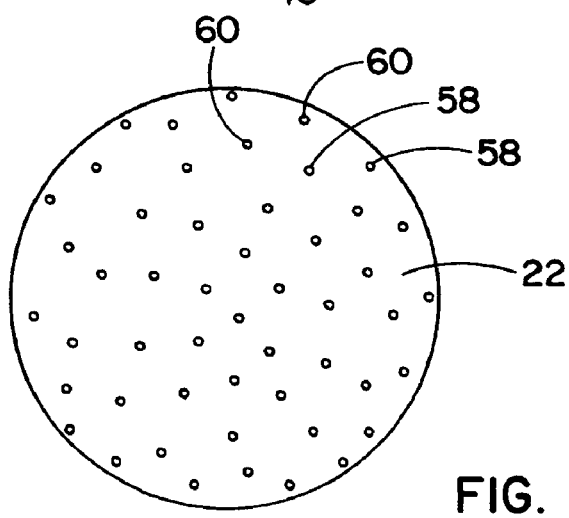
FIG. 3 is an enlarged view of the portion of the side of the power transmission belt in FIG. 2 within the circle in FIG. 2.

One specific, exemplary form of power transmission belt, made according to the present invention, is shown at 12 in FIGS. 2 and 3. The power transmission belt 12 is what is commonly referred to as a raw edge, cogged belt, typically used as a speed changing belt on various equipment, such as snowmobiles, scooters, and general industrial machinery. The belt 12 has a body 14 with an inside 16, outside 18, and oppositely facing, spaced sides 20,22.

The body 14 consists of a compression rubber layer 24, a tension rubber layer 26, and a cushion rubber layer 28 between the compression and tension rubber layers 24,26. Spirally wrapped, load carrying members/cords 30 define the belt neutral axis, outside of which a tension section at 32 is formed and inside of which a compression section at 34 is formed. The load carrying cords 30 may be made from fibers and are embedded in the cushion rubber layer 28. A reinforcing cloth layer 36 is provided on the outside 38 of the tension rubber layer 26. A like reinforcing cloth layer 40 is provided on the inside 42 of the compression rubber layer 24.

The body 14 has an endless length, as indicated by the double-headed arrow LL. Cogs 44 are arranged at regular intervals along the length of the body 14.

Side surface portions 46,48 are square cut, i.e., flat and substantially parallel to each other, in the tension section 32. Side surface portions 50,52 are bias cut with respect to a reference plane P bisecting the body 14 between the sides 20,22 thereof. The square cut side surface portions 46,48 are substantially orthogonal to the outside surface 54 of the body 14, as defined by the reinforcing cloth layer 36.

In FIG. 1, the dimension "L" represents a distance from the outside surface 54 of the body 14 to the outside 56 of the load carrying cords 30. The vertical dimension of the bias cut side surface portions 50,52 is identified by the dimension L1. The transition between the square cut side surface portions 46,48 and bias cut side surface portions 50,52 occurs at a boundary location BL. The vertical dimension of the square cut side surface portions 46,48 is identified by L3. According to the invention, the dimension L3 is equal to 90-100% of the distance/dimension L.

In this embodiment, the sides 20,22 each makes an angle θ with respect to vertical. θ is preferably from 20-60°. A belt of this type is referred to as a wide angle belt.

In the embodiment shown in FIGS. 2 and 3, the boundary location BL is coincident with the outside of the load carrying cords 30. That is, L3 is equal to L, or in other words, the transition location between the side surface portions 46, 48 and 50, 52 is spaced from the outside surface 54 a distance L.

With the belt 12 in this shape, the pitch line of the load carrying cords 30 will always come into contact with a cooperating pulley 57. Accordingly, the power transmission efficiency of the belt 12 can be maintained at a high level. At the same time, the amount of scrap produced in forming the belt 12 can be maintained at a relatively low level.

In the event that the boundary location BL is shifted upwardly from the outside 56 of the load carrying cords 30 such that the spacing of the boundary line BL from the outside surface 54 is less than 90% of L, generally no problems are caused with respect to the power transmission efficiency for the belt 12. However, this condition is not preferred in that a larger quantity of shaving scrap is generated during belt formation.

In the event that the boundary location BL is moved, such that the spacing of the boundary location BL from the outside surface 54 is greater than 100% of L, the load carrying cords 30 become separated from the sides of the cooperating pulley 57, as a result of which power transmission efficiency for the belt 12 may deteriorate. Belt jumping may also occur. Further, the shaved scrap produced during formation of the belt 12 may be so thin that it is prone to breaking loose as the belt preform travels during the formation process.

As seen in FIGS. 2 and 3, short, staple, reinforcing fibers 58 re embedded in the compression rubber layer 24 with their lengths extending generally sideways. The end surfaces 60 of the fibers 58 that are exposed at the sides 20,22 are preferably cut to be flush at the sides 20,22. As a result, the combined areas of the exposed fiber surfaces 60 can be controlled relative to the overall surface area of the sides 20,22, within which the fibers 58 are provided, to increase as desired the friction coefficient between the sides 20,22 and the cooperating pulley 57. As a result, abrasion at initial startup and heat generation as a result of belt slippage can be controlled. A belt of high durability can be made with this construction.

Preferably, the total area of the exposed fiber surfaces 60 is between 20-70% of the entire area of the bias cut side surface portions 50,52. If this ratio is lower than 20%, the friction coefficient between the sides 20,22 and cooperating pulley 57 is increased, as a result of which noise may be generated by adhesive abrasion. Further, since the cumulative area of the exposed fiber surfaces 60 is relatively small, the reinforcing effect from the fibers 58 may be inadequate.

On the other hand, if the ratio exceeds 70%, the belt 12 will have a tendency to slip relative to the pulley 57, which causes abrasion and frictional heat generation.

The invention contemplates that any load carrying member(s) can be used between the tension and compression sections 32,34. In this embodiment, load carrying cords 30 are shown which may be made from polyester fibers, aramid fibers, and/or glass fibers. It is desirable that the cords have a total denier of 4,000-8,000 in which polyester fiber filament groups, having main components that are ethylene-2, 6-naphthalate, are twisted together and subjected to adhesion treatment. The ratio of the belt slippage can thus be controlled. Additionally, the belt life can be maintained at an adequate level. In one exemplary embodiment, the final twist number of the cords 30 is 10-23/10 cm, with the initial twist number being 17-38/10 cm.

In the event that the total denier is lower than 4,000, the modulus of the load carrying cords 30 may become too low. If the total denier exceeds 8,000, the belt 12 may become too thick, as a result of which bending properties are compromised and the belt 12 may be prone to bending fatigue.

The rubber in the tension and compression sections 32,34 may be the same or different. Suitable rubbers are: natural rubber, butyl rubber, styrene-butadiene rubber, chloroprene rubber, ethylene-propylene rubber, alkylated chlorosulfunated polyethylene, hydrogenated nitrile rubber, mixed polymer of hydrogenated nitrile rubber and unsaturated carboxylic acid metal salt. The above components may be used alone or in any combination.

The fibers 58 may be aramid fibers, polyamide fibers, polyester fibers, cotton, etc. The preferred lengths of the fibers 58 depend upon the fiber composition. Generally, a preferred length is 1-10 mm. For example, if aramid fibers are used, a length of 3-5 mm is preferred. In the case of polyamide fiber, polyester fiber, and cotton, a length of 5-10 mm is preferred.

As noted above, the lengths of the fibers 58 are oriented generally from side to side. Assuming directly side to side is taken to be at a 90° angle, it is preferred that the lengths of the fibers 58 be oriented in a range of 70 to 110°.

Preferably, the tension rubber layer 26 does not include any reinforcing fibers 58. Reinforcing fibers 58 may be provided in the cushion rubber layer 28, however, more preferably, no fibers are provided therein.

The cloth layers 36,40 may be made of cotton, polyester fiber, nylon, or the like, that is plain woven, twill woven or sateen woven. The cloth layers 36,40 may be wide angle canvas, with a crossing angle of warp and weft in the range of 90-120°. The cloth layers 36,40 may be subjected to RFL treatment, after which the cloth is friction coated with rubber. In one embodiment, RFL solution is made in such a manner that an initial condensate of resorcinol and formaldehyde is mixed with latex. Suitable latex includes: chloroprene, styrene-butadiene-vinylpyridine ternary copolymer, hydrogenated nitrile rubber, and NBR.

Figure 4:
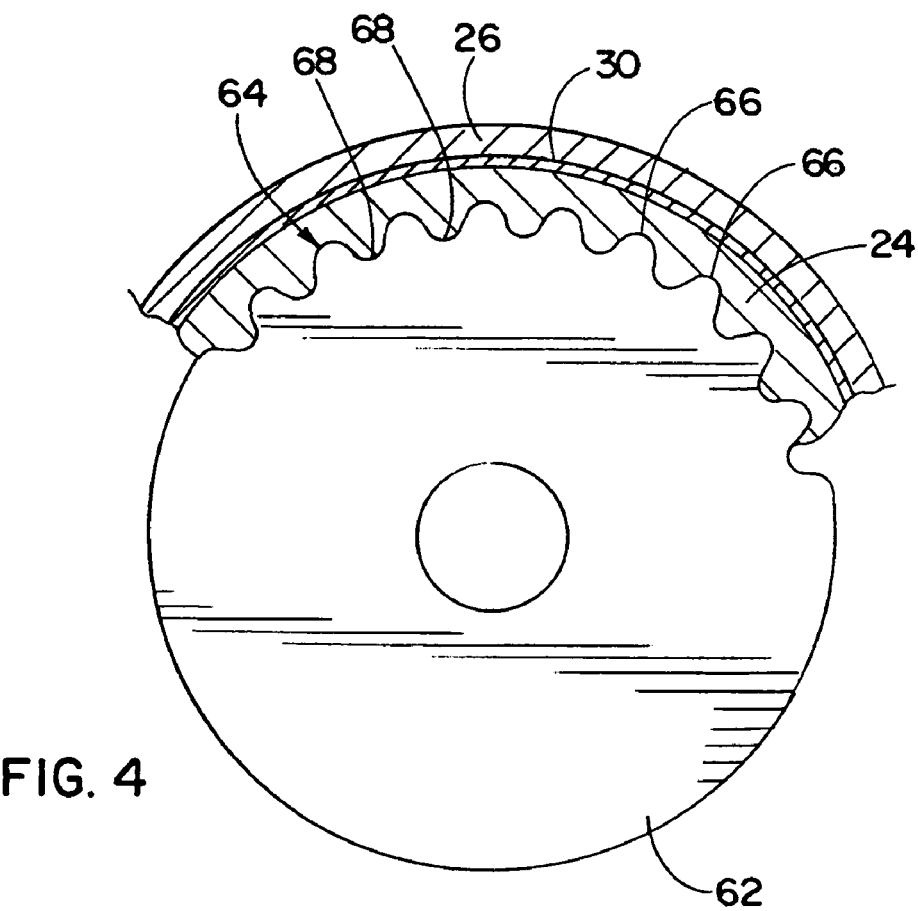
FIG. 4 is a fragmentary, side elevation view of a mold with components of a belt/belt sleeve preform formed thereon.

One exemplary method of forming the belt 12 is shown in FIG. 4. In FIG. 4, the body 14 is defined by serially building up the compression rubber layer 24, loading carrying cords 30, and tension rubber layer 26 upon a mold 62. The mold 62 has a peripheral surface 64 with alternating projections and grooves 66,68 at regularly spaced intervals around the surface 64.

As an alternative to the mold construction shown in FIG. 4, a mold can be used with an inner mother mold in which corresponding projections and grooves are alternatingly formed in a circumferential direction at regular intervals.

Figure 5:
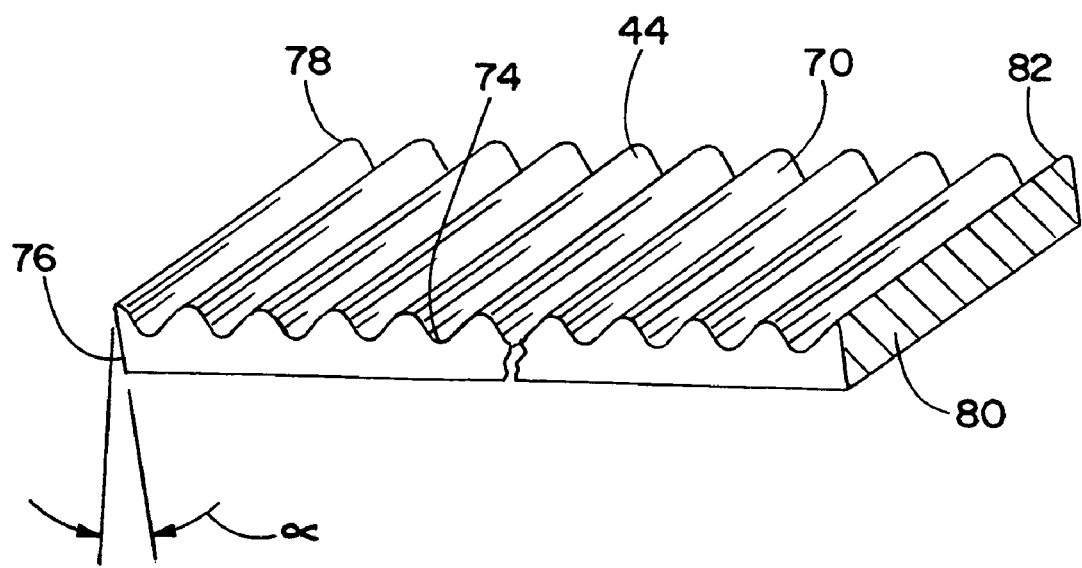
FIG. 5 is a perspective of a cog pad used to form a belt/belt sleeve preform.

As a further alternative, as shown in FIG. 5, a pre-formed cog pad 70 may be used to form the belt 12. The cog pad 70 is made as follows. In one exemplary embodiment, one or several sheets of reinforcing cloth, an unvulcanized rubber sheet, which will become part of the compression rubber layer 24, and an unvulcanized rubber sheet, which will become the cushion rubber layer 28, are laminated upon each other and set on a flat, metallic mold (not shown) which is preformed with projections and grooves in a desired alternating pattern. This assembly is then pressurized, as a result of which the cogs 44 and grooves 74, between adjacent cogs 44, are formed by the mold.

One end 76 of the cog pad 70 is bias cut at a cog crest 78 to an angle α, which is preferably 0-40°. The cog pad 70 is inverted and the other end 80 likewise bias cut in the same manner in a reversely inclined direction at a spaced crest 82. Through this arrangement, the ends 76,80 can be butted into close contact with each other to produce an endless configuration for the cog pad 70.

The mold 62 of FIG. 4 can then be attached to a forming machine (not shown). The cog pad 70 in turn be engaged with the peripheral surface 64 of the mold 62 so that the cogs 44 and grooves 74 complementarily mate with the projections 66 and grooves 68 on the mold 62. The length of the cog pad 70 is controlled so that the cog pad 70 will extend continuously around the mold 62 with the ends 76,80 butted. Once the cog pad 70 is put in place, the load carrying cords 30 are spirally wrapped. Thereafter, from one to several sheets of reinforcing cloth, and an unvulcanized rubber sheet, which will become the tension rubber layer 26, are wound over the load carrying cords 30. Through this procedure, a belt/belt sleeve preform assembly is constructed.

Once these steps are completed, the assembly is surrounded by a jacket, placed in a vulcanization vessel and vulcanized using conventional processes. After the completion of vulcanization, the jacket and belt/belt sleeve preform are separated from the mold 62.

As a further method of making a belt/belt sleeve preform, reinforcing cloth/canvas 40 may be attached in the grooves 68 of the mold 62 as by a pinion roller, as hereinafter described. A rubber sheet is wound thereover and the end faces thereof butted to form an endless body. This rubber sheet is then heated and pressurized from the outer circumference and preliminarily fit at the peripheral surface 64 of the mold 62 in a meshing fashion, as described above. On the exposed surface of the rubber layer which overlies the mold 62, load carrying cords and a separate rubber sheet are successively wound to complete the belt/belt sleeve preform.

In all embodiments, as described herein, the width of the starting preform may be equal to the width of a single belt or may have a width sufficient that several belts can be cut therefrom. For purposes of simplicity, the preform will be generically identified as a "belt/belt sleeve" preform in the written description and claims herein, with it being understood that this term will encompass any different width of sleeve be it for a single belt or multiple belts.

The belt/belt sleeve will hereinafter be identified with the reference numeral "12" with the corresponding preform identified with the reference numeral "12'".

The application of the reinforcing cloth layer 40 to a mold 84, referenced above, will be described in detail with respect to FIG. 6. A rubber adhesive 85, such as mucilage, is coated on projections 86 and grooves 88 on the peripheral surface 90 of the mold 84 with a sprayer, brushes or rollers. In this embodiment, a cylindrical mother mold is attached to a metallic mold. Then the reinforcing cloth layer 40, which may or may not have been subjected to adhesion treatment, is applied to the peripheral surface 90. Thereafter, a pinion roller 92 is moved radially inwardly with one of a series of teeth 94 thereon registered with one of the grooves 88 on the mold 84. The mold 84 is thereafter rotated about its axis 96 in the direction of the arrow 98. The reinforcing cloth layer 40, at the projection 86 shown at A, is pressed against on one side of a crest region thereon by a round, peripheral surface 100 on the pinion roller 92, from which the teeth 94 project. As this occurs, the free end 102 of the engaged tooth 94 extends into the groove 88 to press the reinforcing cloth layer 40 flushly against the peripheral surface 90 at the bottom of the groove 88.

Figure 6:
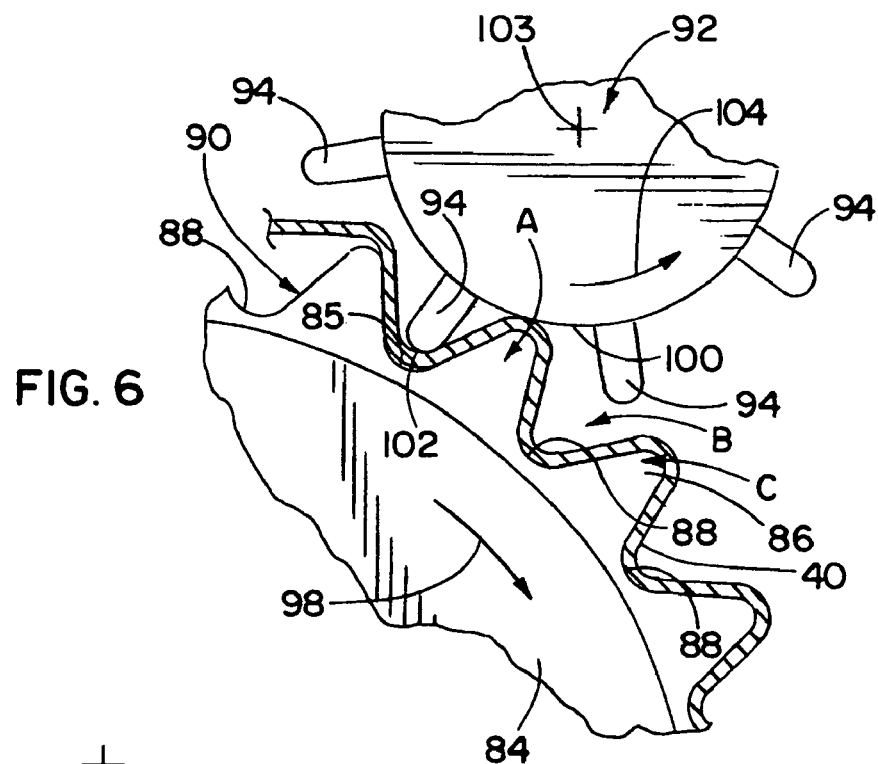
FIG. 6 is an enlarged, fragmentary, elevation view of a portion of a mold with a reinforcing fabric layer being placed thereagainst through a pinion roller.

As the mold 84 and pinion roller 92 continue to relatively rotate from the FIG. 6 position, the peripheral surface 100 of the pinion roller 92 captures the reinforcing cloth layer 40 against the projection 86 at A on the other side of the crest region, thereby securing the cloth layer 40 thereat before the upstream tooth 94 moves into the groove 88 at B after which the surface 100 presses the cloth layer 40 against a side of the crest on the projection 86 at C.

Through this sequence of events, the reinforcing cloth layer 40 can be smoothly and consistently conformed to each groove 88 without forcibly elongating the reinforcing cloth layer 40. With one active tooth 94 in a groove 88, the adjacent teeth 94 are separated from the reinforcing cloth layer 40 so as to not tend to stretch the same. Thus there is little likelihood that the reinforcing cloth layer 40 will deform or float. By repeating this action through continued meshed rotation of the mold 84 about the axis 96 and pinion roller 92 about the axis 104, the reinforcing cloth layer 40 becomes tightly conformed to the entire peripheral surface 90 of the mold 84. One to four plies of the reinforcing cloth layer 40 may be applied in this manner. At the conclusion of this process, the reinforcing cloth layer is cut and the cut end stuck to the mold 84.

The adhesive used to secure the reinforcing cloth layer 40 may consist of different rubber compositions dissolved in solvent, such as methylethylketone (MEK) and toluene that are mixed with each other. With this rubber adhesive, the reinforcing cloth layer 40 can be tightly and securely held to the peripheral surface 90 of the mold 84.

Figure 7:
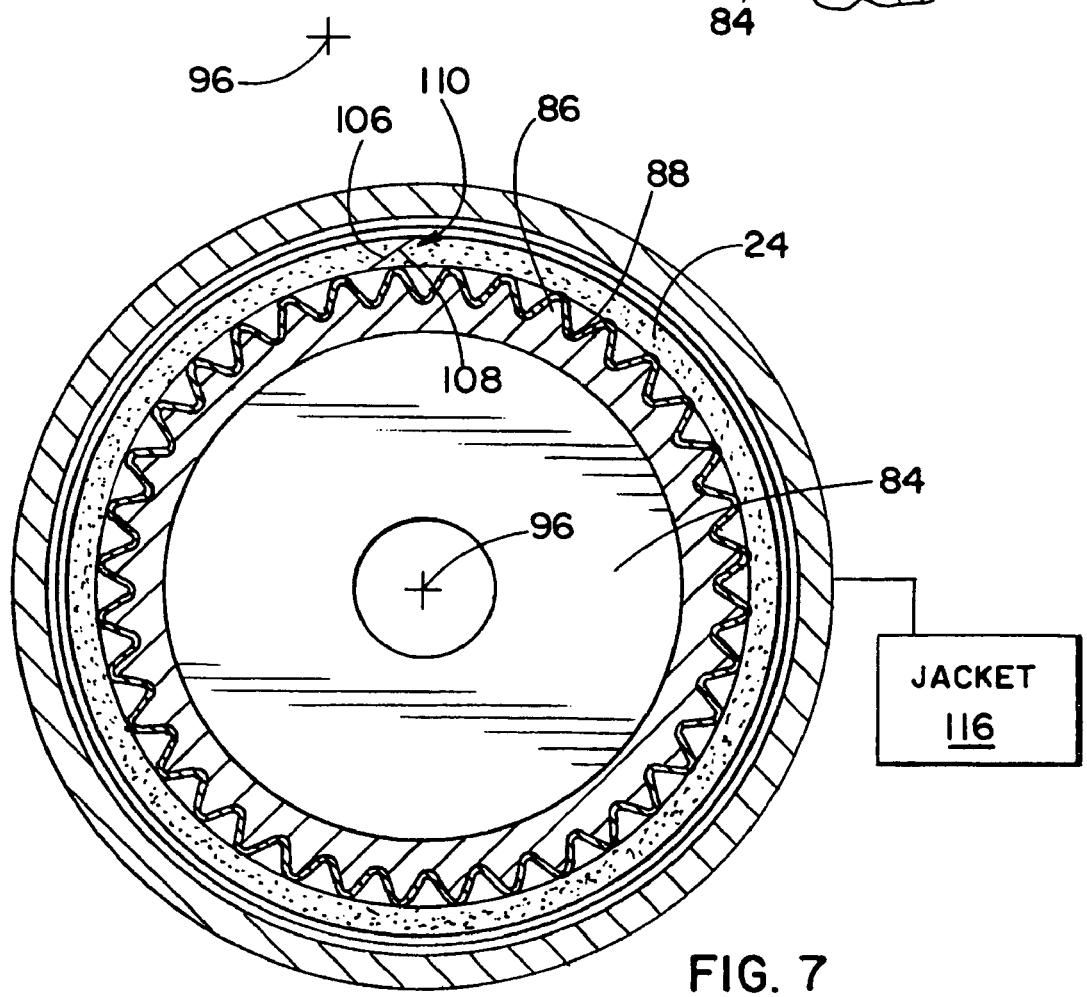
FIG. 7 is a side elevation view of a mold in which a compression rubber layer is formed therearound preparatory to treatment under controlled temperature and pressure conditions.
Figure 8:
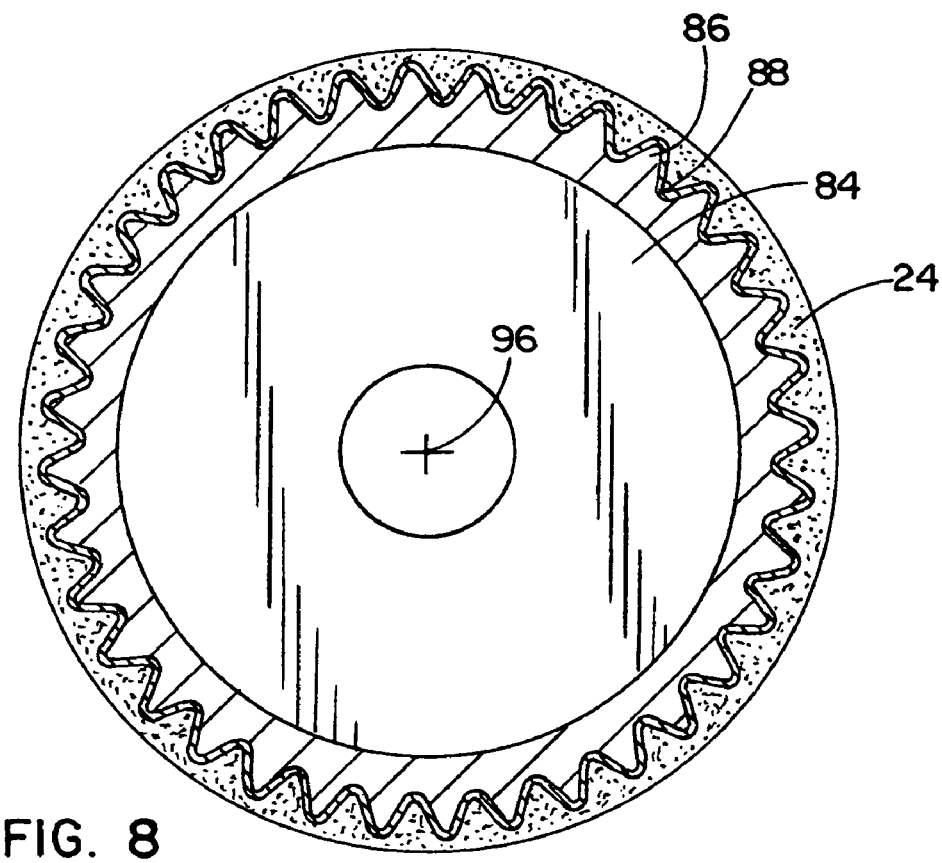
FIG. 8 is a view as in FIG. 7 after the compression rubber layer has been treated.

As shown in FIGS. 7 and 8, the compression rubber layer 24 is applied to the mold 84 by wrapping the same therearound and butting cut end faces 106, 108 together to form an endless shape. At this point, the compression rubber layer 24 is unvulcanized. The ends 106, 108 thereof are preferably cut to facilitate connection and maintain integrity at a joint 110. A pressurizing jig (not shown) can be used to tighten the connection at the joint 110. Additionally, heating and pressurization may be carried out, as by a heating press (not shown), to more positively secure the ends 106,108.

In one embodiment, the heating and pressurization are carried out at a temperature of from 80-120° C., with a surface pressure of 1 to 2 kg/cm$^2$ for 10-30 seconds. Preferably, the joint 110 is located at a groove 88 on the mold 84. If the joint 110 is located at a projection 86, the joint 110 tends to move towards the bottom of a cog 44 in the completed belt 12. As a result, there is a greater tendency for cracking to start at the joint 110.

A resin film, having good heat resistance and good mold releasing properties, is wound around the compression rubber layer 24. Preferably, a single ply is used. The resin film may be made of polymethylpentene or polyethylene terephthalate, which is an adhesion preventing agent.

The compression rubber layer 24 on the mold 84 is prepared for vulcanization using a vulcanization jacket 116. This assembly is then placed in a vulcanization vessel and treated for 5-10 minutes at a temperature of 160-180° C. with an external pressure of 0.8 to 0.9 MPa. Through this process, the compression rubber layer 24 conforms to the mold 84, as shown in FIG. 8. During the vulcanization process, no cracks are generated at the joint 110.

It should be understood that the mold attaching process can be conducted in such a manner that the outside of the compression rubber layer 24 is heated and pressurized by a band system or a press system without using a vulcanization jacket and vessel.

Figure 9:
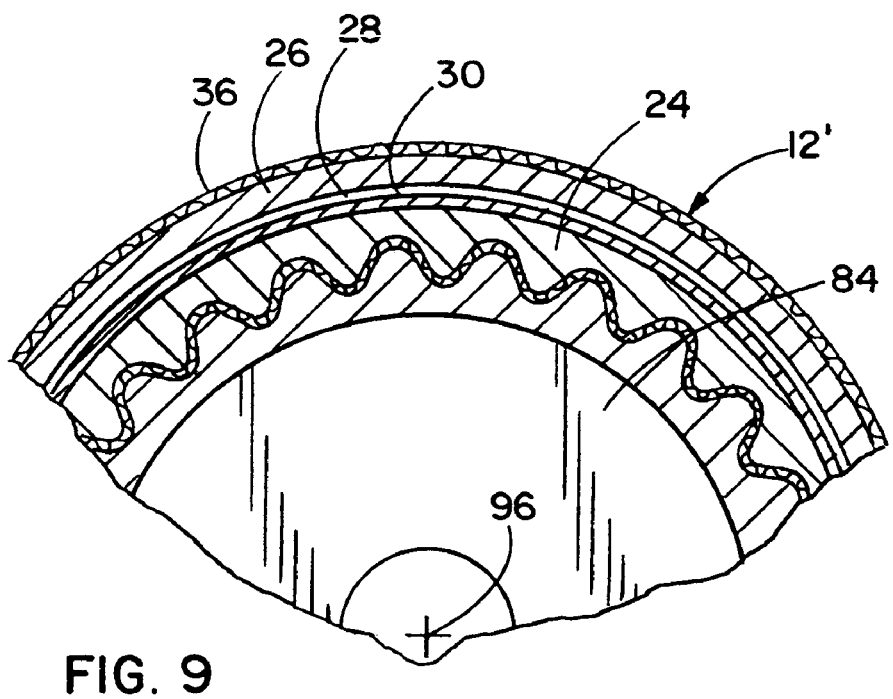
FIG. 9 is a fragmentary, side elevation view of a mold with belt/belt sleeve components, used to make a belt as in FIG. 1, built up therearound.

In FIG. 9, the mold 84, upon which the compression rubber layer 24 is formed, as previously described, is set in a forming machine (not shown), after which the load carrying cords 30 are spirally wrapped therearound. Thereafter, the cushion rubber layer 28 is applied followed by the tension rubber layer 26 and the reinforcing cloth layer 36. The mold 84 can then be removed from the forming machine and set on a support table engaged by the aforementioned vulcanization jacket 116.

This assembly can then be placed in a vulcanization vessel with vulcanization carried out in a conventional manner. At the completion of vulcanization, the jacket 116 is separated from the mold 84 and the belt/belt sleeve preform 12' in turn separated from the mold 84.

Next, the resulting belt/belt sleeve preform 12' is set on a mandrel and squarely cut to a predetermined width corresponding to a desired width for the completed belt 12. Accordingly, the resulting belt preform 12' is rectangular, as shown in FIG. 10. The single belt preform 12' is then mounted on a belt forming apparatus 120, as shown in FIGS. 11-16. The sides 20',22' of the belt preform 12' are then bias cut by a cutter, consisting of pair of cutting blades 124,124', which separate an endless ring of scrap that is removed from the completed belt 12. The belt 12 is completed by forming the sides 20,22 with the resulting square cut side surface portions 46,48 and bias cut side surface portions 50,52 (see FIG. 2).

Details of one preferred form of belt forming apparatus 120 will now be described with respect to FIGS. 11-16. The belt forming apparatus 120 consists of spaced shafts 126, 128, which are respectively rotatable around spaced, parallel axes 130,132. The belt/belt sleeve preform 12' is trained around the shafts 126,128. The shaft 126 is driven by a motor 134 in the direction of the arrow A around the axis 130 and thereby causes the belt/belt sleeve preform 12' to move in an endless travel path, as indicated by the arrows A1.

Figures 12, 13:
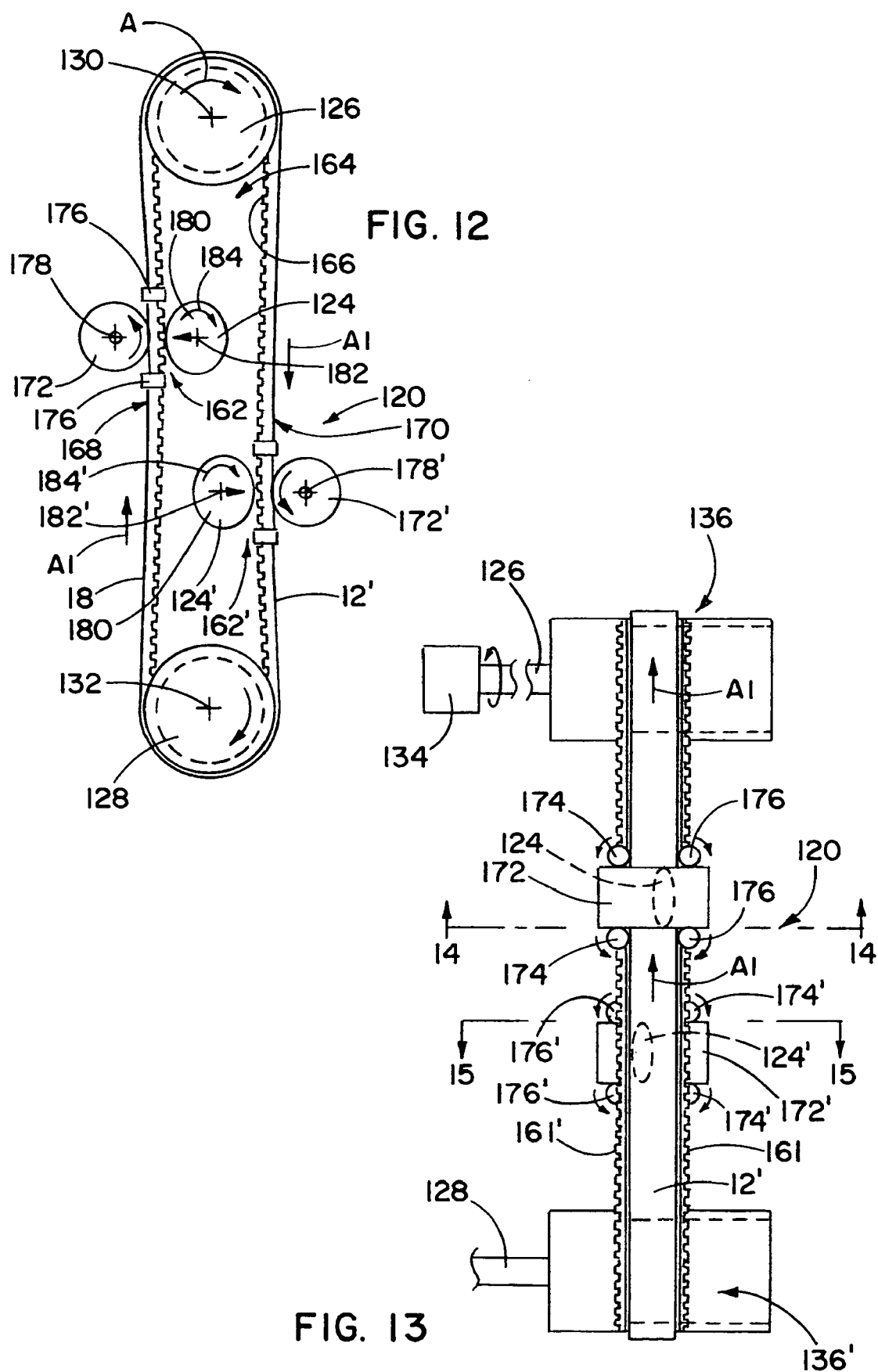
FIG. 12 is a view as in FIG. 11 from a perspective turned 90° from that in FIG. 11.
FIG. 13 is a view as in FIG. 11 wherein a belt/belt sleeve preform has been cut and scrap pieces removed during cutting remain intact.
Figure 14:
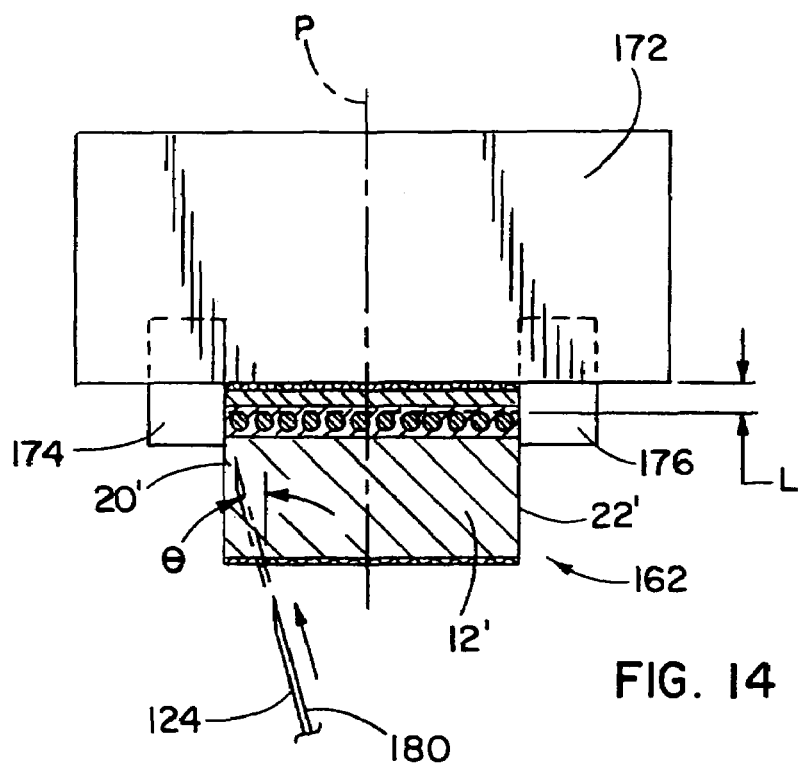
FIG. 14 is a cross-sectional view of the belt forming apparatus taken along line 14-14 of FIG. 13.
Figure 15:
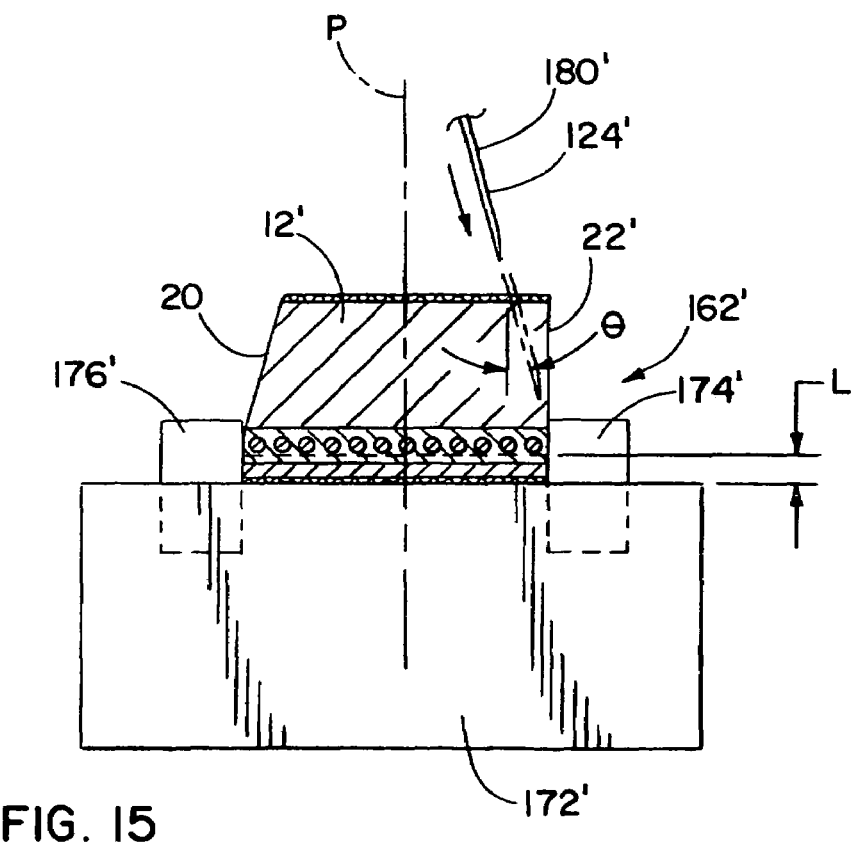
FIG. 15 is a cross-sectional view of the belt forming apparatus taken along lines 15-15 of FIG. 13.
Figure 16:
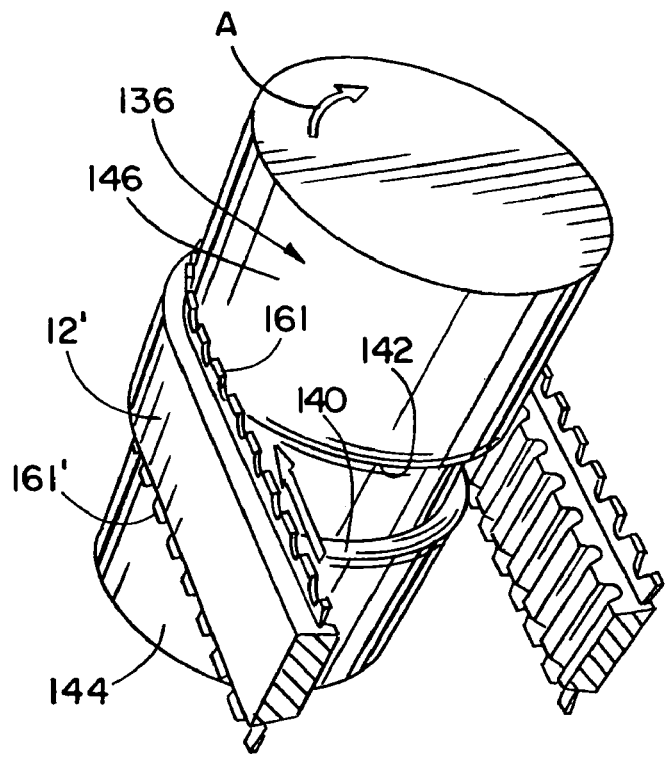
FIG. 16 is an enlarged, fragmentary, perspective view of a shaft on the inventive belt forming apparatus with a belt/belt sleeve preform trained therearound and scrap pieces cut therefrom and embracing the shaft.

Both of the shafts 126,128 project from left to right in FIGS. 11 and 13 in cantilevered fashion. The shaft 126 includes a mounting assembly 136 with a small diameter portion 138 bounded by larger diameter portions 140,142. The larger diameter portion 140 is defined by a stationary flange 144, with the larger diameter portion 142 defined by a movable flange 146. The outside surface 54 of the belt preform 12' (FIG. 10) bears on a radially outwardly facing surface 148 at the small diameter portion 138. Corners 150,152 on the flanges 144,146, respectively, are radiussed/rounded to facilitate guiding of the belt/belt sleeve preform 12' thereover to against the surface 148 between the flanges 144,146.

The flange 146 is in the form of a cylinder that is movable towards and away from the stationary flange 144, as indicated by the double-headed 25 arrow 154, along the axis 130. The flange 146 is guidable along the surface 148. With this arrangement, a belt receiving groove 156 is formed cooperatively by the surface 148 and flanges 144,146.

The shaft 128 has a corresponding mounting assembly 136' with a small diameter portion 138' bounded by larger diameter portions 140',142' which are formed on stationary and movable flanges 144',146', respectively. A belt receiving groove 156' is thereby defined that is alignable with the groove 156.

The shaft 128 is movable selectively in the direction of the double-headed arrow 158 towards and away from the shaft 126 to thereby selectively decrease and increase the spacing between the shafts 126,128. With the belt/belt sleeve preform 12' loosely trained around the shafts 126,128, the shaft 128 can be moved away from the shaft 126 to thereby tension the belt/belt sleeve preform 12'. By moving the shaft 128 towards the shaft 126, tension on the trained belt/belt sleeve preform 12' can be released to facilitate separation of the completed belt/belt sleeve 12.

By moving the flanges 146,146' towards and away from the stationary flanges 144,144' along the line of the double-headed arrows 154,154', respectively, the width W of the grooves 156,156' can be selectively narrowed and widened. With the belt/belt sleeve preform 12' trained around the shafts 126,128, movement of the flanges 146,146' toward the flanges 144,144' can be carried out to capture the belt/belt sleeve preform 12' between the larger diameter portions 140,142 on the shaft 126 and 140',142' on the shaft 128. The movable flanges 146,146' may be moved synchronously, as by a pneumatic or hydraulic means 160, to thereby maintain the width W of the grooves 156,156' at all times the same.

The radial depth of the grooves 156,156' is preferably such that at least a part of the compression section 34 (FIG. 10) is received in the groove and resides between the larger diameter portions 140,142 and 140',142'. If only the tension section 32 is accommodated by the grooves 156,156', removed scrap 161, 161' (FIG. 13), as discussed in detail hereinbelow, may not shift over to the larger diameter portions 140,142 and 140',142' to follow movement thereof. As a result, the scrap may interfere with the basic cutting operations and may have to be removed as a procedure is being carried out. Further, a more positive gripping of the belt/belt sleeve preform 12' can be effected with a deeper groove construction.

The belt/belt sleeve preform 12' is initially mounted by moving the shaft 128 towards the shaft 126 so that the belt/belt sleeve preform 12' can be loosely trained around the shafts 126,128 in the vicinity of the grooves 156,156'. Thereafter, the shaft 128 is moved away from the shaft 126 to tension the mounted belt/belt sleeve preform 12'. Preferably, the belt tension is 400-1,200 N.

In this embodiment, as shown most clearly in FIG. 12, there are two spaced cutting locations at 162,162' within a cutting space 164 bounded by an inner circumference 166 of the belt/belt sleeve preform 12'. The cutting location 162 is on a length 168 of the belt/belt sleeve preform between the shafts 126,128 that is under running tension, i.e. pulled by the driven shaft 126. The cutting location 162' is on a length 170 of the belt/belt sleeve preform 12 between the shafts 126,128 that is in a return path portion so as not to be under running tension.

A pushing component 172, as in the form of a synthetic resin roller, is mounted at the cutting location 162 and bears against the outside 18 of the belt/belt sleeve preform 12' to reinforce the same during a cutting operation. A like pushing component 172' is provided at the cutting location 162' to perform the same function.

Guide elements 174,176 are provided to bear captively on the spaced sides of the belt/belt sleeve preform 12' to confine movement thereof, transverse to the length of the belt/belt sleeve preform 12', during a cutting operation. In this embodiment, there are two guide elements 174,176 on each side of the belt/belt sleeve preform 12'.

Similar guide elements 174',176' are provided at the cutting location 162'. The guide elements 174,174',176,176' are each in the form of rollers which are rotated as the traveling belt/belt sleeve preform 12' bears thereagainst. Similarly, the pushing rollers 172,172' are rotatable about axes 178,178' as the traveling belt/belt sleeve preform 12' is borne thereagainst during a cutting operation.

The guide rollers 174,176' each has a fixed rotational axis.

Through an appropriate mechanism (not shown) the rollers 176,174' are movable transversely to the length of the belt/belt sleeve preform 12' selectively towards and away from the rollers 174,176' to conform to the particular width of the mounted belt/belt sleeve preform 12'. All of the rollers 174,174',176,176' can be simultaneously rotated as they bear against the traveling belt/belt sleeve preform 12'. As seen in FIG. 11, the pushing roller 172 resides vertically between the guide roller pairs 174,176, with the pushing roller 172' likewise residing vertically between the guide roller pairs 174',176'.

The apparatus 120 is set up so that the outside 18 (FIG. 10) of the belt/belt sleeve preform 12' is borne against by the pushing rollers 172,172' with a predetermined pressure. The pressure between the pushing rollers 172, 172' and the belt/belt sleeve preform 12' can be adjusted in the range of 15-50 N. The movable rollers 176,174' are adjusted transversely to the belt/belt sleeve preform length to cause the roller pairs 174,176 and 174', 176' to either exert a captive pressure on the sides of the belt/belt sleeve preform 12' or to be placed in close proximity to the sides 20', 22'.

With the apparatus 120 so set up, the motor 134 can be operated to drive the shaft 126. This causes the belt/belt sleeve preform 12' to travel in the endless path which is predetermined by reason of the captive arrangement of the belt/belt sleeve preform 12' within the grooves 156,156' and between the guide rollers 174,174',176,176'. Consequently, the belt/belt sleeve preform 12' can be consistently guided without any significant deviation from a linear travel path. Accordingly, accurate cutting of the belt/belt sleeve preform 12' is facilitated.

At the cutting location 162, the cutting blade 124 has a disk-shaped body 180 that is inclined with respect to the belt/belt sleeve preform. The disk-shaped body 180 is rotated about its axis 182 in the direction of the arrow 184 through contact with the traveling belt/belt sleeve preform 12'. As previously noted, the cutting blade 124 is provided at the cutting location in vertical coincidence with the pushing roller 172 whereby the belt/belt sleeve preform 12' is pinched therebetween during a cutting operation. The body 180 of the cutting blade 124 obliquely penetrates the belt/belt sleeve body from the inside thereof to produce a bias cut with respect to the aforementioned reference plane P, that bisects the belt/belt sleeve preform 12' between the sides thereof and is orthogonal to the axes 130,132.

The cutting blade 124 and pushing roller 172 are configured and relatively positioned so that the cutting blade 124 cannot contact the pushing roller 172 during operation of the apparatus 120. As a result, the pushing roller 172 is not prone to being damaged by the cutting blade 124, as a result of which it has a long useful life. Further, the accuracy of the cutting can be maintained since the guiding components will not be damaged in use.

The cutting blade 124' has a corresponding disk-shaped body 180' that is rotatable around an axis 182' in the direction of the arrow 184'. The cutting blade 124' cooperates with the pushing roller 172' in the same manner that the cutting blade 124 cooperates with the pushing roller 172, as described above.

As noted previously, the bias cutting of the sides 20,22 occurs from the inside of the belt/belt sleeve preform 12' up to the boundary location BL. In this particular embodiment, the distance L3, representing the vertical dimension of the square cut side surface portions 46,48, is equal to L. The angle θ of attack for the cutting blades 124,124' can be set as desired, and preferably is in the range of 20-60°.

A complete operation for forming the belt 12 in FIG. 2, using the apparatus 120, will now be described. As shown in FIG. 11, the moving means 160 is operated to move the flanges 146,146' away from the flanges 144,144' so that the grooves 156,156' are wider than the belt/belt sleeve preform 12' to be trained around the shafts 126,128. Similarly, the guide rollers 176,174' are moved away from the rollers 174,176' to again be spaced by a distance greater than the width of the belt/belt sleeve preform 12' that is to be cut.

The shaft 128 is moved toward the shaft 126 to permit training of the belt/belt sleeve preform 12' around the shafts 126,128 and preliminary alignment of the belt/belt sleeve preform 12' at the grooves 156,156'. The shaft 128 is then moved away from the shaft 126 to tension the belt/belt sleeve preform 12'. The moving means 160 is then operated to advance the flanges 146,146' towards the flanges 144,144' to captively maintain the belt/belt sleeve preform 12' within the grooves 156,156'. As previously noted, the grooves 156,156' have a sufficient radial extent that a part of the compression rubber layer 24 resides therewithin. The square cut side surface portions 46,48 are thus captive between the larger diameter portions 140,142 and 140,142'. A portion of the compression rubber layer 24 likewise resides between the larger diameter portions 140,142 and 140',142' so that the belt/belt sleeve preform is firmly captively held for consistent alignment.

The guide rollers 176,174' are then moved towards the guide rollers 174,176' to captively engage the belt/belt sleeve preform 12' at the cutting locations 162,162'.

The motor 134 can then be operated so that the tensioned belt/belt sleeve preform 12' is driven in an endless travel path. At each cutting location 162,162', the cutting blades 124,124' are obliquely pressed into the compression rubber layer 24 at an angle θ relative to the reference plane P, with the belt/belt sleeve preform 12' captively squeezed between the cutting blades 124,124' and the pushing rollers 172,172'. As a result, one side 20' of the belt/belt sleeve preform 12' is bias cut by the one cutting blade 124, with the other side 22' bias cut by the other cutting blade 124'. As the cutting is carried out at the cutting locations 162,162', the belt/belt sleeve preform 12' is stabily held and maintained in its linear travel path by the cooperating cutting blades 124,124', pushing rollers 172,172' and guide rollers 174,174',176,176'.

Endless, ring-shaped scrap pieces 161, 161' are separated from the belt/belt sleeve preform 12' by the cutting blades 124, 124', respectively. At the moment of separation, the scrap pieces 161,161' are squeezed axially outwardly relative to the shaft axes 130,132 to engage and embrace the larger diameter portions 140,140',142,142' so as to thereby follow rotational movement of the shafts 126,128. The scrap pieces 161, 161' are actually wedged axially outwardly by a component of the squeezing force between the cutting blades 124,124' and pushing rollers 172,172'. Alternatively, it can be considered that the scrap pieces 161,161' are pushed out by a wedge shape at the leading end of the cutting blades 124,124'. The rounded corners 150,152 on the flanges 144,146, and like rounded corners 150',152' on the flanges 144',146', facilitate transition of the scrap pieces 161, 161' from a region at the small diameter portions 138,138' to the larger diameter portions 140,142,140',142'. The scrap pieces 161, 161' embrace, and continue to follow movement of the shafts 126,128 until the tension upon the belt/belt sleeve preform 12' is released. Thus, there is little possibility that these scrap pieces 161, 161' will interfere with operation of the apparatus 120 during a cutting operation. At the same time, the scrap pieces 161, 161' can be conveniently recovered at the completion of the cutting operation by loosening the tension and effecting simple separation of each as one piece.

At the completion of the cutting operation, rotation of the shaft 126 is stopped and the cutting blades 124,124', guide rollers 176,174', and flanges 146,146' are returned to their starting positions. After this occurs, the belt tension can be released and the belt/belt sleeve 12 and scrap pieces 161, 161' separated.

The invention contemplates many variations from the basic structure, described above, which is intended to be exemplary in nature only. As one example, the belt construction is not limited to a belt having cogs in the compression section thereof. A double cogged belt could be made using the same inventive concepts, with cogs provided in the tension section 32 as well.

As another variation, while the pushing rollers 172,172' act against the outside of the belt/belt sleeve preform 12', the pushing rollers 172,172' could operate on the opposite side at which, in this embodiment, the cogs are formed, i.e., at the compression section 34. The pushing rollers 172, 172' can also be made adjustable relative to an operative belt/belt sleeve preform.

While two shafts 126,128 are described, three or more shafts could be used to guide movement of the belt/belt sleeve preform 12', and can be operated in other than a continuous linear path. Especially in the case of a long belt, with a rectangular cross section, the belt can be bias cut while the belt is running potentially around three or more shafts, so long as an appropriate tension is applied to the belt at each cutting location.

While the mounting assemblies 136,136' have been described with one stationary flange 144,144' and one movable flange 146,146', two fixed and/or two movable flanges could likewise be used to practice the invention. It is desirable that the belt/belt sleeve preform 12' be positively captured between larger diameter portions and preferably, in the case of the belt construction shown, with the compression rubber layer between the larger diameter portions.

While the moving means 160 has been described to simultaneously move the flanges 146,146', movement of the flanges 146,146' may be carried out serially, or otherwise.

While cutting has been described at locations 162,162', with one location of the belt/belt sleeve preform 12' under running tension and the other location in a return path/ untensioned portion, both cutting locations could be at the same tensioned/untensioned location. If this takes place, more preferably, the cutting would occur at a location where the belt/belt sleeve preform 12' is under running tension so as to avoid deflection of the belt during the cutting operation. Any significant deflection may compromise the accuracy of the bias cutting process.

Further, the location of the cutting blades 124,124' and pushing components 172,172' can be reversed.

As another modification, the rounding/radiussing of the corners 150,152,150',152' can be omitted. This transition structure is desired, however. As an alternative to radiussing the corners, the corners can be chamfered, or otherwise modified.

The cutting blades 124,124' may be either simultaneously operated, or operated, one after the other, with a time lag.

As also noted above, the invention can be practiced on virtually any type of the belt, whether or not it has cogs.

One specific process for making and forming one exemplary form of the belt 12 will now be described. The load carrying cords 30 were made with aramid fibers, sold under the trademark TWARON. The cords 30 had a denier of 1,500 and were twisted in a reverse direction with respect to the vertical direction with a final twist number of 19.7 times per 10 cm and an initial twist number of 15.8 times per 10 cm so as to attain a 2×3 untreated cord with a total denier of 9,000. The untreated cord was predipped in an isocyanate adhesive and dried at about 170-180° C. and dipped in an RFL solution. The cord was then subjected to elongation thermal fixing treatment at 200-240° C.

With respect to the reinforcing cloth layers 36,40, wide angle plain weave canvas was used with twisted yarns in which aramid fibers, sold under the trademark TWARON, and polyethylene teraphthalate fibers were mixed with each other in a weight ratio of 50:50. The canvas was dipped in RFL solution and was subjected to heat treatment at 150° C. for two minutes. After that, the treated canvas was coated with a rubber composition using a friction coating process.

The compression and tension rubber layers 26,28 were made from chloroprene rubber with embedded, aramid short staple fibers in an amount 25 weight parts per 100 weight parts of rubber. The cushion rubber layer 26 was made of chloroprene rubber with no short staple reinforcing fibers therein.

The cog pad 70 was made as follows. One piece of reinforcing cloth and a sheet for the compression rubber layer were laminated together and set on a flat mold having cogs with alternating grooves and projections. The system was pressurized at 75° C. Through this process, the cog pad 70 was formed. Both ends of the cog pad were vertically cut off at crest portions.

The cog pad 70 was wound around an inner mother mold, made of vulcanized rubber, attached to a cylindrical mold, and the ends butted to each other. Load carrying cords 30, an unvulcanized rubber sheet for the tension rubber layer 26, and a reinforcing cloth layer 36 were successively wound thereover. A jacket was placed over this assembly, which was set in a vulcanization vessel in which vulcanization was carried out. The belt/belt sleeve preform 12' was thus produced.

The resulting belt/belt sleeve 12' was squarely cut with a cutter and finished into individual belt preforms 12' with a rectangular shape in cross section. The belt preforms 12' were arranged on the shafts 126,128 of the belt forming apparatus 120 and operated as cutting took place through the compression rubber layer with the belt preforms 12' backed by pushing rollers 172,172'. The boundary location BL was set at 100% L and the sides 20',22' bias cut with the cutting blades 124,124'. A raw edge cogged belt 12 was thus produced.

The sides 20,22 were cut at an angle of 42° with the short staple reinforcing fibers 58 exposed in flush relationship at the sides 20,22. The resulting raw edge cogged belt had a length of 300 mm and was set on a V pulley with a 90 mm diameter with a winding angle of 45°. A load of 2.7 N was applied to one end of the belt and a load F, necessary to draw the other end at a speed of 30 mm per second, was measured. The friction coefficient was found from this load F.

The above belt 12 was set up on a two shaft horizontal-type running tester with a drive pulley having a 167.4 mm diameter and driven pulley with a 133.0 mm diameter. The driven pulley had an applied load of 330 kgf.

The drive pulley was rotated at 3,000 rpm. After six hours of test running, a quantity of abrasion was measured by dividing the belt weight, which was measured six hours after test running, by the belt weight, which was measured before the start of the running test.

The results of the running test are described below. When a friction coefficient of a conventional belt, the surface of which was polished by sanding on a face which had been subjected to bias cutting, was 1, the friction coefficient of the inventive belt was 1.4. When quantities of abrasion were compared after the running test of six hours, the quantity of abrasion was 1 in the case of the conventional belt. On the other hand, the quantity of abrasion was 0.7 for the inventive belt.

Further, the temperature of the side of the conventional belt was 135° C. after a running test of one hour. On the other hand, the temperature of the side of the inventive belt was 126° C., which was lower than the temperature of the conventional belt.

As previously noted, the belt of the present invention may be made so that slippage of the belt, particularly as running is initiated, is small, so that the quantity of abrasion at the time of initial startup can be suppressed and the belt temperature can be maintained reasonably low.

Figure 19:
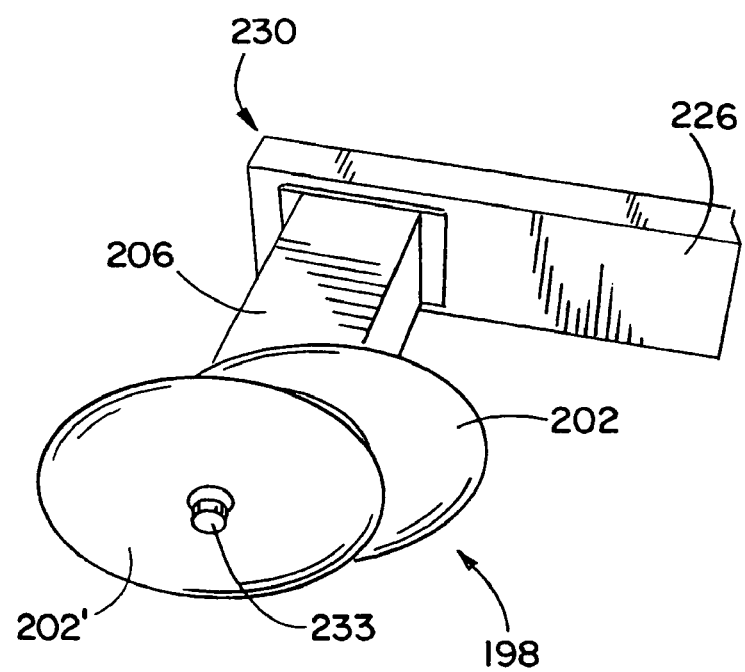
FIG. 19 is an enlarged, fragmentary, perspective view of a cutter on the apparatus in FIGS. 17 and 18 and an elongate support arm therefor.
Figure 17:
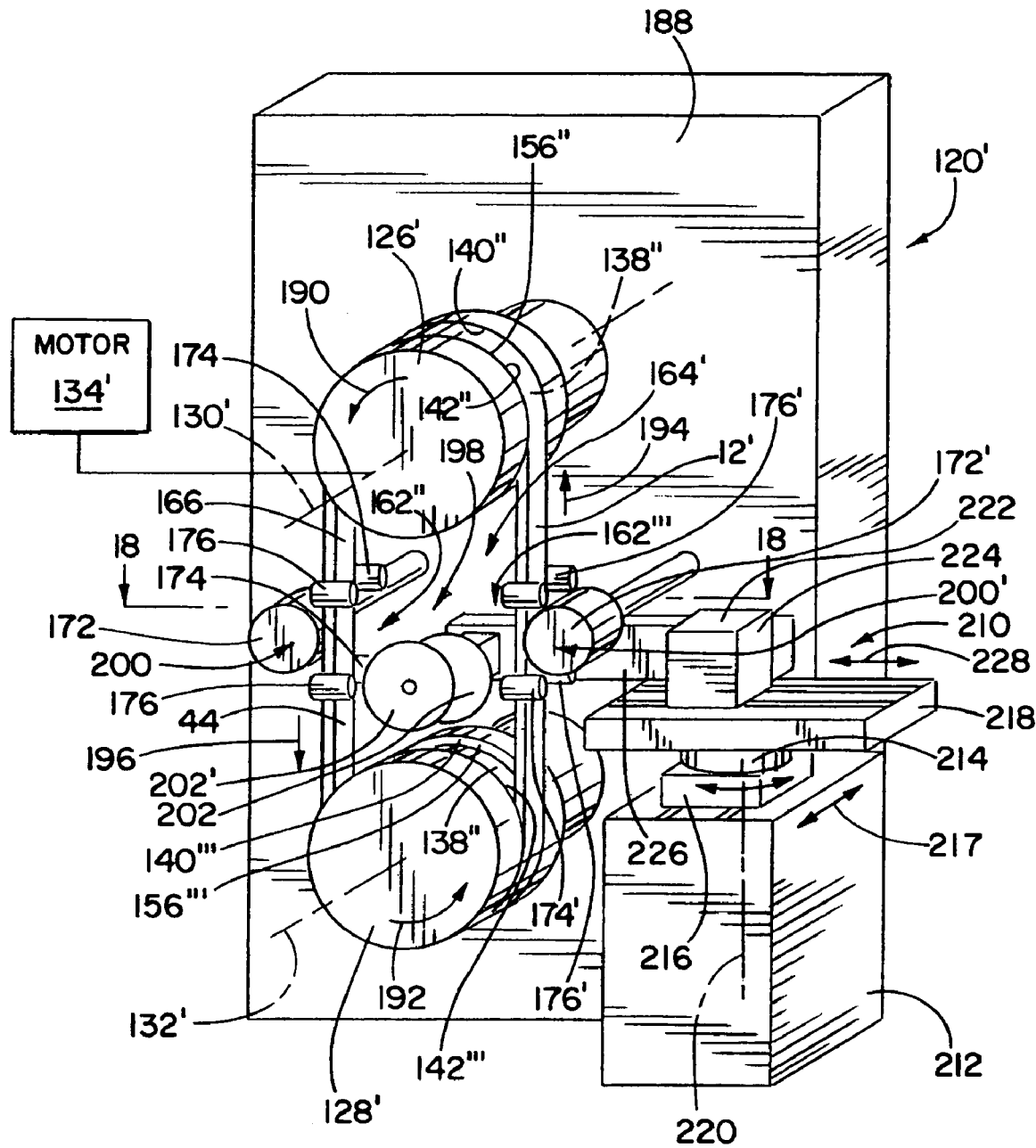
FIG. 17 is a perspective view of a modified form of belt forming apparatus, according to the present invention.
Figure 18:
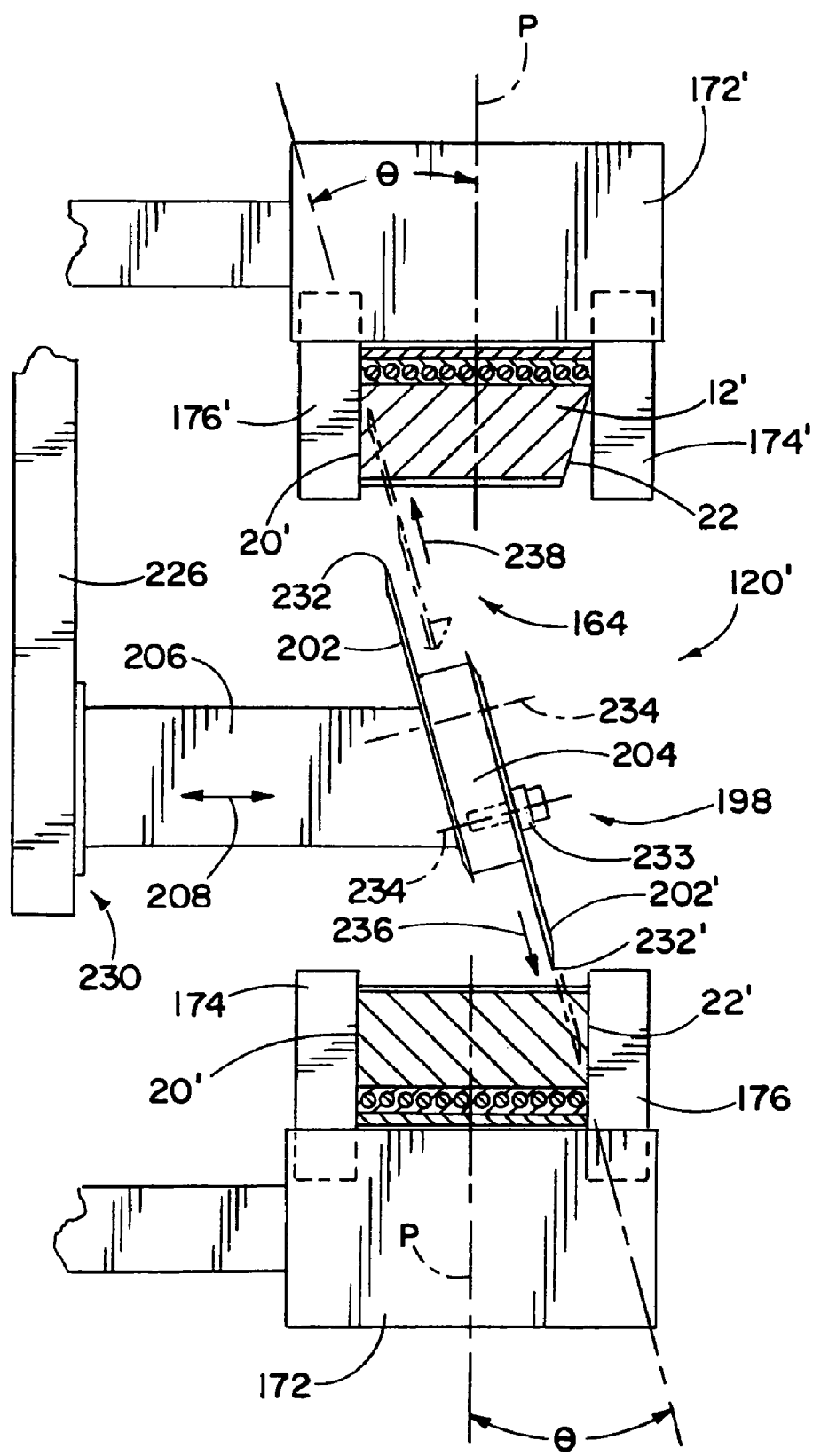
FIG. 18 is a cross-sectional view of a part of the belt forming apparatus taken along line 18-18 of FIG. 17.

In FIGS. 17-19, a modified form of belt forming apparatus, according to the present invention, is shown at 120'. The belt forming apparatus 120' consists of a main body 188 and driving and driven shafts 126',128', corresponding to the shafts 126,128 for the belt forming apparatus 120. The shafts 126',128' are rotatable around axis 130',132', respectively.

The shafts 126',128' project in cantilevered fashion from the main body 188 outwardly of the page in FIG. 17. At least one of the shafts 126',128' is movable towards the other of the shafts 126',128' to change the vertical spacing therebetween to facilitate mounting of a belt/belt sleeve preform 12' therearound. This facilitates treatment of different belt sizes and also mounting and removal of belt/belt sleeve preforms 12' preparatory to, and after, processing.

A motor 134' drives the shaft 126' in the direction of the arrow 190 around the axis 130'. As this occurs, a belt/belt sleeve preform 12', trained around the shafts 126',128', is cause to move in an endless path, whereby the shaft 128' is caused to rotate in the direction of the arrow 192 around its axis 132'. With this arrangement, the belt/belt sleeve preform 12' is under running tension in the path portion indicated by the arrow 194 and returns untensioned in the path portion indicated by the arrow 196.

The belt/belt sleeve preform 12' can have any configuration and is shown in an exemplary cog belt form, as previously described with respect to FIG. 2. The belt/belt sleeve preform 12' is pre-cut so that the sides 20',22' are parallel to each other and the body 14 is rectangular in cross section. With a cogged construction, the cogs 44 (not shown in detail) are on the inner circumference 166 which bounds a cutting space 164'.

The shafts 126',128' may have the same construction as the shafts 126,128, previously described, or may have a different construction. In a preferred form, the shaft 126' has a groove 156". The shaft 126' has a small diameter portion 138" bounded by larger diameter portions 140",142", corresponding in structure and function to like numbered parts in the prior embodiment. Similarly, the shaft 128' has a small diameter portion 138''' bounded by larger diameter portions 140'''. 142'''.

The width of the grooves 156",156''' can be fixed or variable through a mechanism as described for the belt forming apparatus 120, or by a different structure. With this arrangement, the belt/belt sleeve preform 12' can be trained around the shafts 126',128' and captive between the larger diameter portions 140",142" and 140'",142'" to be consistently guided in a linear travel path.

A cutter 198 is provided in the cutting space 164 and is designed to bias cut the traveling belt/belt sleeve preform 12' at cutting locations 162",162'", corresponding to the aforementioned cutting locations 162,162'.

At each cutting location 162", 162'", belt guide/supporting assemblies 200,200' are provided. The belt guide/supporting assembly 200 consists of the same components as at the cutting location 162; namely the pushing component/roller 172 and guide elements/rollers 174,176. Similarly, the belt guide/supporting assembly 200' consists of the same components as at the cutting location 162'; namely the pushing component/roller 172' and the guide elements 174',176'.

The cutter 198 consists of disk-shaped cutting blades 202,202' attached to a base 204 on a cantilevered arm 206 that projects into the cutting space 164'. The arm 206 has a length in the direction of the double-headed arrow 208 that is generally parallel to the rotational axes 130', 132' for the shafts 126',128'.

The belt forming apparatus 120' includes a cutter controlling mechanism at 210 with a first stationary support table 212. A rotary base 214 is mounted to a slide 216, which is guided in translatory movement relative to the table 212 along a line, indicated by the double-headed arrow 217. The base 214 supports a second table 218 that is movable therewith relative to the slide 216 in rotation around a vertical axis 220. An arm carrier 222 consists of a base 224 and an elongate support 226 that is cantilever mounted to the base 224. The base 224 is guidingly translatable relative to the second table 218 along a line indicated by the double-headed arrow 228, orthogonally to the line indicated by the arrow 217. The elongate support 226 has a free end 230, remote from the base 224, to which the arm 208 is cantilever mounted. The length of the arm 208 extends substantially orthogonally to the length of the elongate support 226.

Servomotors, or other structure (not shown), are provided for translating the slide 216 relative to the first table 212, pivoting the rotary base 214 relative to the slide 216, and translating the base 224 relative to the second table 218. Through a programmed, coordinated movement, the cutter 198 on the arm 208 can be translated and reoriented within the cutting space 164.

The cutting blades 202,202' have the same configuration, though this is not a requirement. Each is in the form of a disk-shaped blade. With this configuration, the entire circumference of each of the cutting blades 202,202' defines a cutting edge 232,232'.

The cutting blades 202,202' are connected to the base 204 and arm 206 as follows. In this embodiment, threaded fastening screws 233 (one shown) secure the cutting blades 202,202' to the base 204 and arm 206. The cutting blades 202,202' have central axes 234,234', respectively. The cutting blades 202,202' are offset axially from each other a distance equal to the thickness of the base 204, but remain in partial radially overlapping relationship, with the axes 234,234' noncoincident. The cutting blades 202,202' are substantially parallel to each other. The position of the cutting blades 202,202' is fixed with respect to each other and the base 204 and arm 206.

By reason of being spaced axially from each other, the cutting blades 202,202' can be fixed positively without interference with each other.

There is no possibility that the cutting blades 202,202' will collide or otherwise interfere with each other. As a result, the blades 202, 202' are not as prone to being damaged, thereby avoiding the possibility of regular maintenance, such as sharpening or replacement, associated with such a problem.

The cutting blades 202,202' are fixed with the cutter 198 in a first state, wherein the fastening screws 233 are tightened. The state of the cutter 198 can be changed by loosening the fastening screws 233, which thereby allows the cutting blades 202,202' to be pivoted around their respective axes 234,234' to expose another portion of the circumference of the cutting edges 232, 232' for use. Thereafter, the cutter 198 can be changed back into the first state to fix the position of the cutting blades 202,202'. The planes within which the cutting edges 233,233' reside are angled with respect to the line of the length of the arm 206.

A cutting operation will now be described with respect to the belt forming apparatus 120', described above. As with the prior embodiment, a rectangular belt/belt sleeve preform 12 can be set in the grooves 156",156'" and trained around the shafts 126',128'. One or both of the shafts 126,128' can be moved to increase the spacing therebetween and thereby tension the belt/belt sleeve preform 12' trained therearound. Preferably, the depth of the grooves 156",156'" is such that a part of the compression rubber layer 24 resides between the larger diameter portions 140",142" and 140'",142'". The pushing component/roller 172,172' and guide elements 174, 174',176,176' are adjusted as previously described, or may be preset to a particularly belt/belt sleeve preform configuration.

Once the system is set up in this manner, the motor 134' is operated. The cutter controlling mechanism 210 is then operated to bias cut one side of the belt/belt sleeve preform with the cutting blade 202 and thereafter the other side with the cutting blade 202'.

More particularly, as seen in FIG. 18, the cutter 198 is driven in the direction of the arrow 236 so that the protruding cutting blade 202' is obliquely directed relative to the reference plane P, bisecting the belt/belt sleeve preform 12' between the sides 20', 22' thereof, to bias cut the side 22' at an angle θ. The cutter 198 is thereafter moved substantially oppositely to the one direction indicated by the arrow 236, in the direction of the arrow 238, to similarly cut the other side 20' of the belt/belt sleeve preform 12' to bias cut that side to the same angle θ relative to the reference plane P.

In this embodiment, the cutting locations 162",162'" are at substantially the same vertical height so that the vertical position of the cutter 198 does not have to be changed. This is not a requirement, however. The pushing rollers 172,172' reinforce the belt/belt sleeve preform 12' during the cutting operation at each side of the belt/belt sleeve preform 12'. Through this arrangement, the belt/belt sleeve preform 12' is positively held and maintained in its linear travel path as the cutting operation is carried out to form the V-shaped belt 12.

By reason of the cutter 198 consisting of a unitary construction wherein the cutting blades 202,202' move as one piece, the cutter 198 can be made relatively compact to function within the cutting space 164. As a result, the overall system construction can be potentially simplified and also may be made relatively light in weight.

Further, by reason of the opposite movement of the cutter 198 within the narrow horizontal dimension of the cutting space 164, a relatively small amount of movement is required for the cutter 198, which potentially reduces processing time compared to the prior art apparatus.

Likewise, the support structure for the cutter 198, including the cantilevered arm 206, can be made relatively simple and compact.

The radially overlapping relationship of the cutting blades 202,202' also contributes to overall system compactness.

The ability to pivot the cutting blades 202,202' avoids having to replace the cutting blades 202,202' on a frequent basis. By selectively pivoting and refixing the cutting blades 202,202', different portions of the cutting edges 232, 232' can be presented as other portions thereof are damaged, wear, or otherwise become dull. Thus, potentially overall maintenance costs and inconveniences can be reduced.

Since the cutter 198 operates on both sides of the belt/belt sleeve preform 12' at the same vertical height, the same cutter 198 can be used to process relatively short belts/belt sleeve preforms 12'.

The invention contemplates many variations from the basic structure described above. Some of these modifications are described below.

The orientation of the cutting blades 202,202', and the distance between their respective axes, can be changed depending upon the bias cut angle and the cutting depth.

As in the prior embodiment, the belt/belt sleeve preform 12' can be trained around more than the two shafts shown and will perform in substantially the same manner.

The nature of the belt guide/supporting assemblies 200, 200' can be changed from what is shown. The number and arrangement of pushing rollers and guide rollers can be changed. As just one example, the pushing rollers are arranged to push the outside surface of the belt/belt sleeve preform 12'. The pushing rollers could be arranged to push the inside of the belt/belt sleeve preform 12' at the region where the cogs are formed in the construction shown.

The particular configuration of the cutter control mechanism 210 is exemplary in nature only. Those skilled in the art could devise virtually an unlimited number of different ways to reposition the cutter 198, potentially departing significantly from the structure shown herein.

While the invention has been described with particular reference to the drawings, it should be understood that various modifications could be made without departing from the spirit and scope of the present invention.

The invention claimed is:

1. An apparatus for forming a power transmission belt/belt sleeve, the apparatus comprising:
   first and second shafts about which an endless belt/belt sleeve preform can be trained,
   at least one of the first and second shafts capable of being driven to cause a belt/belt sleeve preform trained around the first and second shafts to be moved in an endless travel path,
   the first shaft having a small diameter portion between spaced larger diameter portions arranged so that the belt/belt sleeve preform traveling around the first and second shafts resides between the larger diameter portions;
   a pushing component at a cutting location;
   at least one guide element at the cutting location; and
   a cutter to bear against and form a part of a belt/belt sleeve preform trained around the first and second shafts,
   the pushing component serving to reinforce a belt/belt sleeve preform that is trained around the first and second shafts and borne against by the cutter,
   the at least one guide element situated to bear against a side of a belt/belt sleeve preform trained around the first and second shafts to confine movement of a belt/belt sleeve preform at the cutting location, and
   wherein a belt/belt sleeve preform trained around the first and second shafts defines an inner circumference within which a cutting space is defined in which the cutter is movable toward and away from the belt/belt sleeve preform.

2. The apparatus according to claim 1 further in combination with an endless belt/belt sleeve preform trained around the first and second shafts, wherein the belt/belt sleeve preform has an inside, an outside, and spaced sides and comprises a compression rubber layer, a tension rubber layer, and at least one load carrying member between the inside and outside of the belt/belt sleeve preform.

3. The apparatus according to claim 2 wherein the spaced sides of the belt/belt sleeve preform are substantially parallel to each other before being formed by the cutter.

4. The apparatus according to claim 3 wherein the belt/belt sleeve preform is placed under tension between the first and second shafts.

5. The apparatus according to claim 3 wherein the cutter is movable relative to the belt/belt sleeve preform to bias cut one of the spaced sides of the belt/belt sleeve preform.

6. The apparatus according to claim 3 wherein the at least one load carrying member has an inside and an outside and a distance from the outside of the belt/belt sleeve preform to the outside of the at least one load carrying member is defined as L and the spaced sides of the belt/belt sleeve preform are bias cut relative to a plane bisecting the belt/belt sleeve preform between the spaced sides from a boundary location that is spaced from the outside of the belt/belt sleeve preform by 90-100% of the distance L to the inside of the belt/belt sleeve preform.

7. The apparatus according to claim 6 wherein as an incident of bias cutting the belt/belt sleeve preform, an endless portion of the belt/belt sleeve preform is separated and caused to embrace one of the spaced larger diameter portions of the first shaft so as to follow rotational movement of the first shaft.

8. The apparatus according to claim 2 wherein the compression rubber layer resides between the larger diameter portions of the first shaft.

9. The apparatus according to claim 2 wherein the spaced sides of the belt/belt sleeve preform are captively held between the larger diameter portions.

10. The apparatus according to claim 2 wherein in the cutting space, the cutter is movable (a) in one direction within the cutting space to reconfigure one of the spaced sides of the belt/belt sleeve preform and (b) generally oppositely to the one direction within the cutting space to reconfigure the other of the spaced sides of the belt/belt sleeve preform.

11. The apparatus according to claim 1 wherein the at least one guide element comprises first and second rollers that bear one each against a respective side of the belt/belt sleeve preform.

12. The apparatus according to claim 1 wherein the pushing component comprises a pushing roller.

13. The apparatus according to claim 1 wherein the pushing component and cutter are relatively situated so that the cutter cannot contact the pushing component as the apparatus is operated.

14. The apparatus according to claim 1 wherein one of the larger diameter portions is movable selectively towards and away from the other of the larger diameter portions.

15. An apparatus for forming a power transmission belt/belt sleeve, the apparatus comprising:
   first and second shafts about which an endless belt/belt sleeve preform can be trained,
   at least one of the first and second shafts capable of being driven to cause a belt/belt sleeve preform trained around the first and second shafts to be moved in an endless travel path;
   a pushing component at a cutting location; and a cutter, wherein a belt/belt sleeve preform trained around the first and second shafts defines an inner circumference within which a cutting space is defined in which the cutter is movable toward and away from the belt/belt sleeve preform, and the cutter movable at the cutting location (a) in one direction to reconfigure one of two spaced sides on a belt/belt sleeve preform trained around the first and second shafts and (b) generally oppositely to the one direction to reconfigure the other of the two spaced sides on a belt/belt sleeve preform trained around the first and second shafts.

16. The apparatus according to claim 15 further in combination with an endless belt/belt sleeve preform trained around the first and second shafts, wherein the belt/belt sleeve preform has an inside, an outside, and the spaced sides and comprises a compression rubber layer, a tension rubber layer, and at least one load carrying member between the inside and outside of the belt/belt sleeve preform.

17. The apparatus according to claim 16 where the cutter resides within the bounds of the inner circumference.

18. The apparatus according to claim 17 wherein the cutter comprises first and second cutting blades carried upon an arm that projects into the cutting space.

19. The apparatus according to claim 18 wherein the arm is elongate with a length extending substantially parallel to an axis around which the first shaft is movable.

20. The apparatus according to claim 19 wherein the arm is movable selectively parallel to and orthogonally to the length of the arm.

21. The apparatus according to claim 16 wherein the spaced sides of the belt/belt sleeve preform are substantially parallel to each other before being reconfigured by the cutter.

22. The apparatus according to claim 16 wherein the cutter comprises first and second cutting blades that can be fixed relative to each other and which are arranged so that one of the cutting blades reconfigures one of the spaced sides of the belt/belt sleeve preform and the other of the cutting blades reconfigures the other of the spaced sides of the belt/belt sleeve preform.

23. The apparatus according to claim 16 wherein the cutter comprises first and second disk-shaped cutting blades each having an axis, the cutting blades radially overlapped with the axes of the first and second cutting blades non-coincident.

24. The apparatus according to claim 23 wherein the first cutting blade can be selectively fixed in different angular positions around the first axis.

25. The apparatus according to claim 16 wherein the pushing component reinforces the belt/belt sleeve preform with the cutter moving in the one direction and the apparatus further comprises a second pushing component to reinforce the belt/belt sleeve preform with the cutter moving oppositely to the one direction.

26. The apparatus according to claim 16 wherein the cutter bias cuts the spaced sides of the belt/belt sleeve preform relative to a reference plane bisecting the belt/belt sleeve preform between the spaced sides of the belt/belt sleeve preform.

27. The apparatus according to claim 16 wherein the spaced sides of the belt/belt sleeve preform are substantially parallel to each other before being reconfigured by the cutter.

* * * * *